(12) United States Patent
Zhang et al.

(10) Patent No.: US 11,689,945 B2
(45) Date of Patent: Jun. 27, 2023

(54) MEASURING CROSS LINK INTERFERENCE

(71) Applicant: QUALCOMM Incorporated, San Diego, CA (US)

(72) Inventors: Xiaoxia Zhang, San Diego, CA (US); Vinay Chande, San Diego, CA (US); Jing Sun, San Diego, CA (US); Tao Luo, San Diego, CA (US); Juan Montojo, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 184 days.

(21) Appl. No.: 17/196,891

(22) Filed: Mar. 9, 2021

(65) Prior Publication Data
US 2021/0289374 A1    Sep. 16, 2021

Related U.S. Application Data

(60) Provisional application No. 62/989,558, filed on Mar. 13, 2020.

(51) Int. Cl.
*H04W 4/00*     (2018.01)
*H04W 24/08*   (2009.01)
(Continued)

(52) U.S. Cl.
CPC .......... *H04W 24/08* (2013.01); *H04L 5/0048* (2013.01); *H04W 24/10* (2013.01)

(58) Field of Classification Search
CPC ..... H04W 24/08; H04W 24/10; H04W 16/28; H04L 5/0048; H04B 7/0695; H04B 7/088; H04B 17/24
(Continued)

(56) References Cited

U.S. PATENT DOCUMENTS

2019/0268503 A1   8/2019  Lidai et al.
2020/0213052 A1*  7/2020  Li ..................... H04L 5/0048
(Continued)

FOREIGN PATENT DOCUMENTS

EP          3567759 A1      11/2019
WO    WO-2019030934 A1      2/2019
WO    WO-2019093014 A1      5/2019

OTHER PUBLICATIONS

Intel Corporation (R1-1900489, Jan. 21-25 of 2019, UE-to-UE CLI measurement and reporting). (Year: 2019).*
(Continued)

*Primary Examiner* — Maharishi V Khirodhar
(74) *Attorney, Agent, or Firm* — Holland & Hart LLP

(57) ABSTRACT

Methods, systems, and devices for wireless communications are described. The methods, systems, and devices may enable a base station to transmit a measurement configuration for measuring interference (e.g., cross link interference (CLI)). The measurement configuration may include a measurement direction configuration for measuring the interference. Additionally or alternatively, the UE may select a measurement direction configuration for measuring interference based on the measurement configuration. The UE may measure interference based on the measurement configuration. The UE may transmit a measurement report to the base station. The measurement report may include an indication of the selected measurement direction configuration.

30 Claims, 20 Drawing Sheets

(51) Int. Cl.
  *H04L 5/00* (2006.01)
  *H04W 24/10* (2009.01)
(58) Field of Classification Search
  USPC .......................................................... 370/252
  See application file for complete search history.

(56) References Cited

U.S. PATENT DOCUMENTS

2020/0344614 A1   10/2020  Takano
2022/0159662 A1*   5/2022  Li ......................... H04W 24/08

OTHER PUBLICATIONS

Intel Corporation: "UE-to-UE CLI Measurement and Reporting", 3GPP Draft, 3GPP TSG RAN WG1 Ad-Hoc Meeting 1901, R1-1900489, 3rd Generation Partnership Project (3GPP), Mobile Competence Centre, 650, Route Des Lucioles, F-06921 Sophia-Antipolis Cedex, France, vol. RAN WG1, No. Taipei, Jan. 21, 2019-Jan. 25, 2019 Jan. 20, 2019 (Jan. 20, 2019), XP051593402, 5 Pages, Retrieved from the Internet: URL:http://www.3gpp.org/ftp/Meetings%5F3GPP%5FSYNC/RAN1/Docs/R1%2D1900489%2Ezip [retrieved on Jan. 20, 2019] p. 2/5 p. 3/5 3.3.
International Search Report and Written Opinion—PCT/US2021/021650—ISA/EPO—dated Jun. 16, 2021.

* cited by examiner

MEASURING CROSS LINK INTERFERENCE

CROSS REFERENCE

The present application for patent claims the benefit of U.S. Provisional Patent Application No. 62/989,558 by ZHANG et al., entitled "MEASURING CROSS LINK INTERFERENCE," filed Mar. 13, 2020, assigned to the assignee hereof, and expressly incorporated by reference in its entirety herein.

FIELD OF TECHNOLOGY

The following relates generally to wireless communications and more specifically to measuring cross link interference (CLI).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications system, a UE may communicate with a base station via a communication link. However, in some examples, a signal from a different UE may interfere with the communication link between the UE and the base station, which may result in delays, inefficient communications, and relatively high signaling overhead.

SUMMARY

The described techniques relate to improved methods, systems, devices, and apparatuses that support measuring cross link interference (CLI). Generally, the described techniques enable a base station to transmit a measurement configuration for measuring interference (e.g., CLI). The measurement configuration may include a measurement direction configuration for measuring the interference. Additionally or alternatively, the UE may select a measurement direction configuration for measuring interference based on the measurement configuration. The UE may measure interference based on the measurement configuration. The UE may transmit a measurement report to the base station. The measurement report may include an indication of the selected measurement direction configuration. The base station may schedule the UE for communication according to the measurement report, which may reduce interference and latency at the UE, among other benefits.

A method of wireless communications at a UE is described. The method may include receiving a measurement configuration for measuring CLI, where the measurement configuration indicates a measurement direction configuration for measuring the CLI, measuring the CLI based on the measurement configuration, and transmitting a measurement report based on measuring the CLI.

An apparatus for wireless communications at a UE is described. The apparatus may include a processor, memory coupled with the processor, and instructions stored in the memory. The instructions may be executable by the processor to cause the apparatus to receive a measurement configuration for measuring CLI, where the measurement configuration indicates a measurement direction configuration for measuring the CLI, measure the CLI based on the measurement configuration, and transmit a measurement report based on measuring the CLI.

Another apparatus for wireless communications at a UE is described. The apparatus may include means for receiving a measurement configuration for measuring CLI, where the measurement configuration indicates a measurement direction configuration for measuring the CLI, measuring the CLI based on the measurement configuration, and transmitting a measurement report based on measuring the CLI.

A non-transitory computer-readable medium storing code for wireless communications at a UE is described. The code may include instructions executable by a processor to receive a measurement configuration for measuring CLI, where the measurement configuration indicates a measurement direction configuration for measuring the CLI, measure the CLI based on the measurement configuration, and transmit a measurement report based on measuring the CLI.

Some examples of the method, apparatuses, and non-transitory computer-readable medium described herein may further include operations, features, means, or instructions for identifying a time period scheduled for measuring the CLI and scheduled for receiving a downlink message, and selecting between the measurement direction configuration for measuring the CLI and a measurement direction configuration for receiving the downlink message based on a priority rule.

In some examples of the method, apparatuses, and non-transitory computer-readable medium described herein, the priority rule prioritizes the measurement direction configuration for measuring the CLI over the measurement direction configuration for measuring the downlink message.

In some examples of the method, apparatuses, and non-transitory computer-readable medium described herein, the priority rule prioritizes the measurement direction configuration for measuring the downlink message over the measurement direction configuration for measuring the CLI.

Some examples of the method, apparatuses, and non-transitory computer-readable medium described herein may further include operations, features, means, or instructions for measuring the CLI and receiving the downlink message during the time period based on the priority rule.

Some examples of the method, apparatuses, and non-transitory computer-readable medium described herein may further include operations, features, means, or instructions for identifying a direction misalignment between the measurement direction configuration for measuring the downlink message and the measurement direction configuration for measuring the CLI, and refraining from measuring the CLI during the time period based on identifying the direction misalignment.

Some examples of the method, apparatuses, and non-transitory computer-readable medium described herein may further include operations, features, means, or instructions for receiving a measurement trigger signal, where measuring the CLI, transmitting the measurement report, or both, may be based on the measurement trigger signal.

In some examples of the method, apparatuses, and non-transitory computer-readable medium described herein, the measurement direction configuration for measuring the CLI indicates a transmission configuration indication indicating a receive beam direction for measuring the CLI.

In some examples of the method, apparatuses, and non-transitory computer-readable medium described herein, the measurement direction configuration for measuring the CLI indicates a quasi-colocation (QCL) configuration.

In some examples of the method, apparatuses, and non-transitory computer-readable medium described herein, the measurement configuration for measuring the CLI includes radio resource control (RRC) signaling, a medium access control-control element (MAC-CE), or downlink control information (DCI).

In some examples of the method, apparatuses, and non-transitory computer-readable medium described herein, the measurement configuration for measuring the CLI further includes an updated measurement direction configuration associated with a set of CLI resource identifiers.

In some examples of the method, apparatuses, and non-transitory computer-readable medium described herein, measuring the CLI may include operations, features, means, or instructions for measuring a sounding reference signal (SRS) reference signal received power (RSRP) or a CLI received signal strength indicator (RSSI).

A method of wireless communications at a UE is described. The method may include receiving a measurement configuration for measuring CLI, selecting a measurement direction configuration for measuring the CLI based on the measurement configuration, and transmitting a measurement report based on measuring the CLI, where the measurement report indicates the measurement direction configuration selected for measuring the CLI.

An apparatus for wireless communications at a UE is described. The apparatus may include a processor, memory coupled with the processor, and instructions stored in the memory. The instructions may be executable by the processor to cause the apparatus to receive a measurement configuration for measuring CLI, select a measurement direction configuration for measuring the CLI based on the measurement configuration, and transmit a measurement report based on measuring the CLI, where the measurement report indicates the measurement direction configuration selected for measuring the CLI.

Another apparatus for wireless communications at a UE is described. The apparatus may include means for receiving a measurement configuration for measuring CLI, selecting a measurement direction configuration for measuring the CLI based on the measurement configuration, and transmitting a measurement report based on measuring the CLI, where the measurement report indicates the measurement direction configuration selected for measuring the CLI.

A non-transitory computer-readable medium storing code for wireless communications at a UE is described. The code may include instructions executable by a processor to receive a measurement configuration for measuring CLI, select a measurement direction configuration for measuring the CLI based on the measurement configuration, and transmit a measurement report based on measuring the CLI, where the measurement report indicates the measurement direction configuration selected for measuring the CLI.

In some examples of the method, apparatuses, and non-transitory computer-readable medium described herein, selecting the measurement direction configuration further may include operations, features, means, or instructions for aligning a first measurement direction configuration for measuring the CLI and a second measurement direction configuration for receiving a downlink message.

In some examples of the method, apparatuses, and non-transitory computer-readable medium described herein, selecting the measurement direction configuration further may include operations, features, means, or instructions for identifying an updated measurement direction configuration based on a channel condition change, the measurement direction configuration selected for measuring the CLI may be based on the updated measurement direction configuration.

Some examples of the method, apparatuses, and non-transitory computer-readable medium described herein may further include operations, features, means, or instructions for receiving a measurement trigger signal, where measuring the CLI, transmitting the measurement report, or both, may be based on the measurement trigger signal.

In some examples of the method, apparatuses, and non-transitory computer-readable medium described herein, the measurement direction configuration selected for measuring the CLI indicates a transmission configuration indication indicating a receive beam direction for measuring the CLI.

In some examples of the method, apparatuses, and non-transitory computer-readable medium described herein, the measurement direction configuration selected for measuring the CLI indicates a QCL configuration.

In some examples of the method, apparatuses, and non-transitory computer-readable medium described herein, the measurement configuration for measuring the CLI includes RRC signaling, a MAC-CE, or DCI.

In some examples of the method, apparatuses, and non-transitory computer-readable medium described herein, measuring the CLI may include operations, features, means, or instructions for measuring an SRS RSRP or a CLI RSSI.

A method of wireless communications at a base station is described. The method may include transmitting a measurement configuration to a UE for measuring CLI, where the measurement configuration indicates a measurement direction configuration for measuring the CLI and receiving a measurement report indicating a measurement of the CLI based on the measurement configuration.

An apparatus for wireless communications at a base station is described. The apparatus may include a processor, memory coupled with the processor, and instructions stored in the memory. The instructions may be executable by the processor to cause the apparatus to transmit a measurement configuration to a UE for measuring CLI, where the measurement configuration indicates a measurement direction configuration for measuring the CLI and receive a measurement report indicating a measurement of the CLI based on the measurement configuration.

Another apparatus for wireless communications at a base station is described. The apparatus may include means for transmitting a measurement configuration to a UE for measuring CLI, where the measurement configuration indicates a measurement direction configuration for measuring the CLI and receiving a measurement report indicating a measurement of the CLI based on the measurement configuration.

A non-transitory computer-readable medium storing code for wireless communications at a base station is described. The code may include instructions executable by a processor to transmit a measurement configuration to a UE for measuring CLI, where the measurement configuration indicates a measurement direction configuration for measuring the CLI and receive a measurement report indicating a measurement of the CLI based on the measurement configuration.

Some examples of the method, apparatuses, and non-transitory computer-readable medium described herein may further include operations, features, means, or instructions for transmitting an indication of a measurement direction configuration for receiving a downlink message, and transmitting an indication of a priority rule for selecting between the measurement direction configuration for measuring the CLI and the measurement direction configuration for receiving the downlink message.

In some examples of the method, apparatuses, and non-transitory computer-readable medium described herein, the priority rule prioritizes the measurement direction configuration for measuring the CLI over the measurement direction configuration for measuring the downlink message.

In some examples of the method, apparatuses, and non-transitory computer-readable medium described herein, the priority rule prioritizes the measurement direction configuration for measuring the downlink message over the measurement direction configuration for measuring the CLI.

Some examples of the method, apparatuses, and non-transitory computer-readable medium described herein may further include operations, features, means, or instructions for transmitting a measurement trigger signal, where receiving the measurement report may be based on the measurement trigger signal.

In some examples of the method, apparatuses, and non-transitory computer-readable medium described herein, the measurement direction configuration for measuring the CLI indicates a transmission configuration indication indicating a receive beam direction for measuring the CLI.

In some examples of the method, apparatuses, and non-transitory computer-readable medium described herein, the measurement direction configuration for measuring the CLI indicates a QCL configuration.

In some examples of the method, apparatuses, and non-transitory computer-readable medium described herein, the measurement configuration for measuring the CLI includes RRC signaling, a MAC-CE, or DCI.

In some examples of the method, apparatuses, and non-transitory computer-readable medium described herein, the measurement of the CLI includes an SRS RSRP or a CLI RSSI.

A method of wireless communications at a base station is described. The method may include transmitting a measurement configuration to a UE for measuring CLI and receiving a measurement report indicating a measurement of the CLI based on the measurement configuration, where the measurement report indicates a measurement direction configuration selected by the UE for measuring the CLI.

An apparatus for wireless communications at a base station is described. The apparatus may include a processor, memory coupled with the processor, and instructions stored in the memory. The instructions may be executable by the processor to cause the apparatus to transmit a measurement configuration to a UE for measuring CLI and receive a measurement report indicating a measurement of the CLI based on the measurement configuration, where the measurement report indicates a measurement direction configuration selected by the UE for measuring the CLI.

Another apparatus for wireless communications at a base station is described. The apparatus may include means for transmitting a measurement configuration to a UE for measuring CLI and receiving a measurement report indicating a measurement of the CLI based on the measurement configuration, where the measurement report indicates a measurement direction configuration selected by the UE for measuring the CLI.

A non-transitory computer-readable medium storing code for wireless communications at a base station is described. The code may include instructions executable by a processor to transmit a measurement configuration to a UE for measuring CLI and receive a measurement report indicating a measurement of the CLI based on the measurement configuration, where the measurement report indicates a measurement direction configuration selected by the UE for measuring the CLI.

Some examples of the method, apparatuses, and non-transitory computer-readable medium described herein may further include operations, features, means, or instructions for transmitting a measurement trigger signal, where receiving the measurement report may be based on the measurement trigger signal.

In some examples of the method, apparatuses, and non-transitory computer-readable medium described herein, the measurement direction configuration selected by the UE for measuring the CLI indicates a transmission configuration indication indicating a receive beam direction for measuring the CLI.

In some examples of the method, apparatuses, and non-transitory computer-readable medium described herein, the measurement direction configuration selected by the UE for measuring the CLI indicates a QCL configuration.

In some examples of the method, apparatuses, and non-transitory computer-readable medium described herein, the measurement configuration for measuring the CLI includes RRC signaling, a MAC-CE, or DCI.

In some examples of the method, apparatuses, and non-transitory computer-readable medium described herein, the measurement of the CLI includes an SRS RSRP or a CLI RSSI.

DETAILED DESCRIPTION

In some wireless communications systems, a base station may transmit a message (e.g., including control information or data) using a beam to a user equipment (UE). However, one or more surrounding UEs may create interference at a communication link between the UE and the base station. This interference may be referred to as cross link interference (CLI). In some cases, the UE may measure the interference and report the measurement to the base station. The UE may perform the interference measurement according to an assumed measurement direction (e.g., related to a quasi-colocation (QCL) configuration). In some cases, the UE may also receive a downlink signal from the base station. The UE may not know which QCL configuration to implement if the downlink signal is in a different symbol than the interference measurement. Thus, when the UE reports an interference measurement to the base station, the base station may not know which QCL configuration the UE implemented. In some examples, such as higher band operation (e.g., where the UE may be equipped with multiple antenna elements and may use analog beamforming techniques), the QCL configuration the UE implements may cause unreported variation in the interference measurement, which may cause inefficiency and relatively high signaling overhead.

Accordingly, the techniques described herein enable a base station to transmit a measurement configuration for measuring interference (e.g., CLI) to the UE. In some cases, the measurement configuration may include a direction configuration for measuring the interference (e.g., a specified QCL configuration). In some other cases, the base station may not signal a direction configuration for measuring the interference, but the UE may select a measurement direction configuration for measuring the interference and then report the selected direction configure to the base station. The UE may measure the interference for a beam associated with the QCL configuration according to the measurement configuration. Additionally or alternatively, the UE may select a direction configuration (e.g., a QCL configuration) for performing a CLI measurement, receiving a downlink message, or both based on a priority rule (e.g., related to the CLI measurement, the downlink message, or both). In some cases, the UE may report the measurement to the base station. The base station may schedule the UE with resources (e.g., time-frequency resources) based on the report.

Aspects of the disclosure are initially described in the context of wireless communications systems. Additional aspects of the disclosure are described with reference to a timeline and process flows. Aspects of the disclosure are further illustrated by and described with reference to apparatus diagrams, system diagrams, and flowcharts that relate to measuring CLI.

Figure 1:
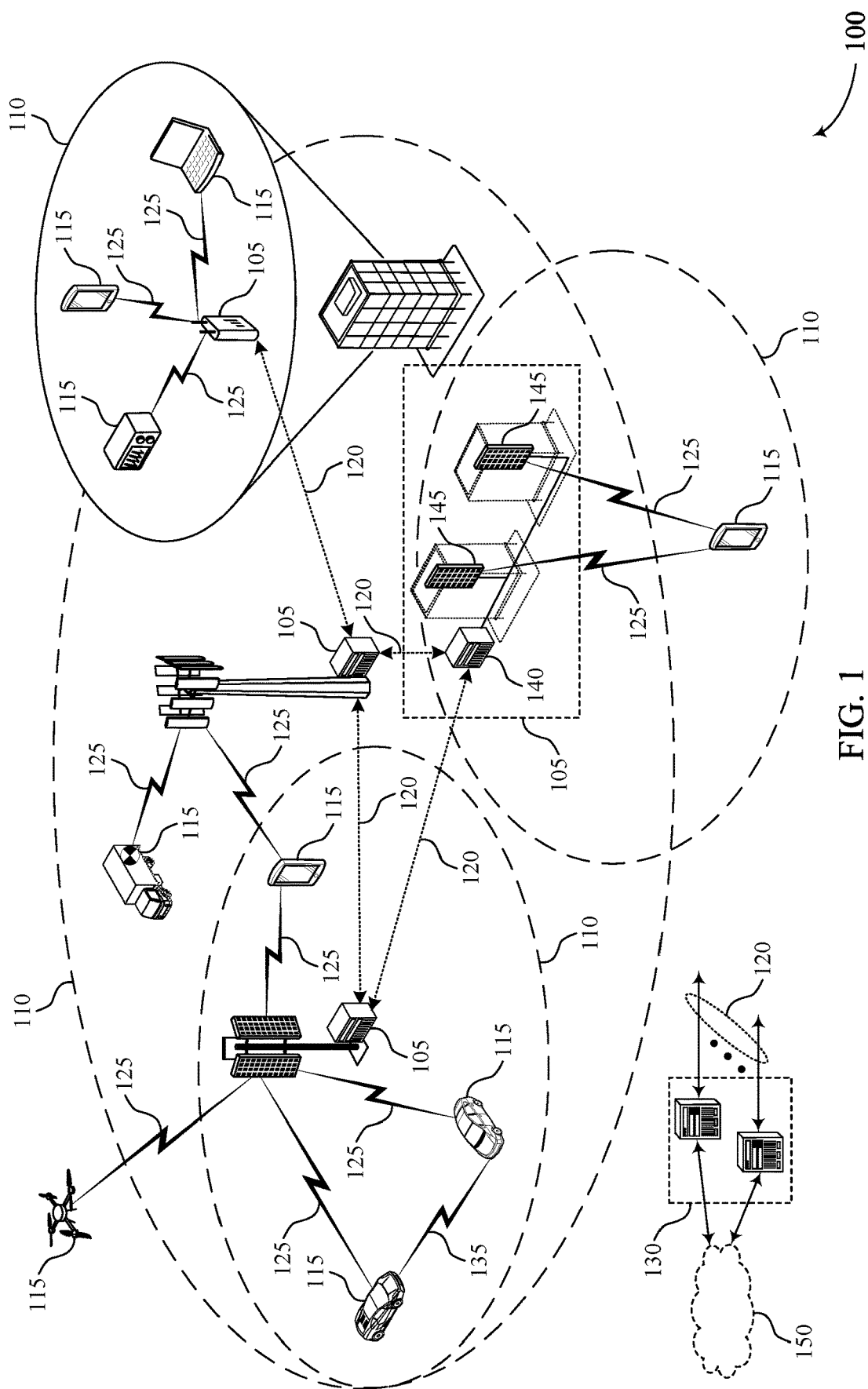
FIGS. 1 and 2 illustrate examples of wireless communications systems that support measuring cross link interference (CLI) in accordance with aspects of the present disclosure.

FIG. 1 illustrates an example of a wireless communications system 100 that supports measuring CLI in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

A base station 105 may transmit a measurement configuration for measuring interference (e.g., CLI). The measurement configuration may include a measurement direction configuration for measuring the interference (e.g., a QCL configuration, a transmission configuration indicator (TCI) indication, etc.). Additionally or alternatively, a UE 115 may select a measurement direction configuration for measuring interference based on the measurement configuration (e.g., even if the base station 105 did not indicate which measurement configuration to use). The UE 115 may measure interference based on the measurement configuration and the measurement direction configuration. The UE 115 may transmit a measurement report to the base station 105. The measurement report may include an indication of the CLI measurement (e.g., via a resource identifier (ID)), and the base station may determine which measurement direction configuration the UE used for the CLI message based on the base station 105 previously signaling a measurement direction configuration for measuring the CLI associated with that resource ID. Additionally or alternatively, the measurement report may include an indication of the selected measurement direction configuration in the case where the base station 105 did not previously indicate which measurement direction configuration to use for a particular CLI measurement. The base station 105 may schedule the UE 115 for communication according to the measurement report, which may reduce interference and latency at the UE 115, among other benefits.

Figure 2:
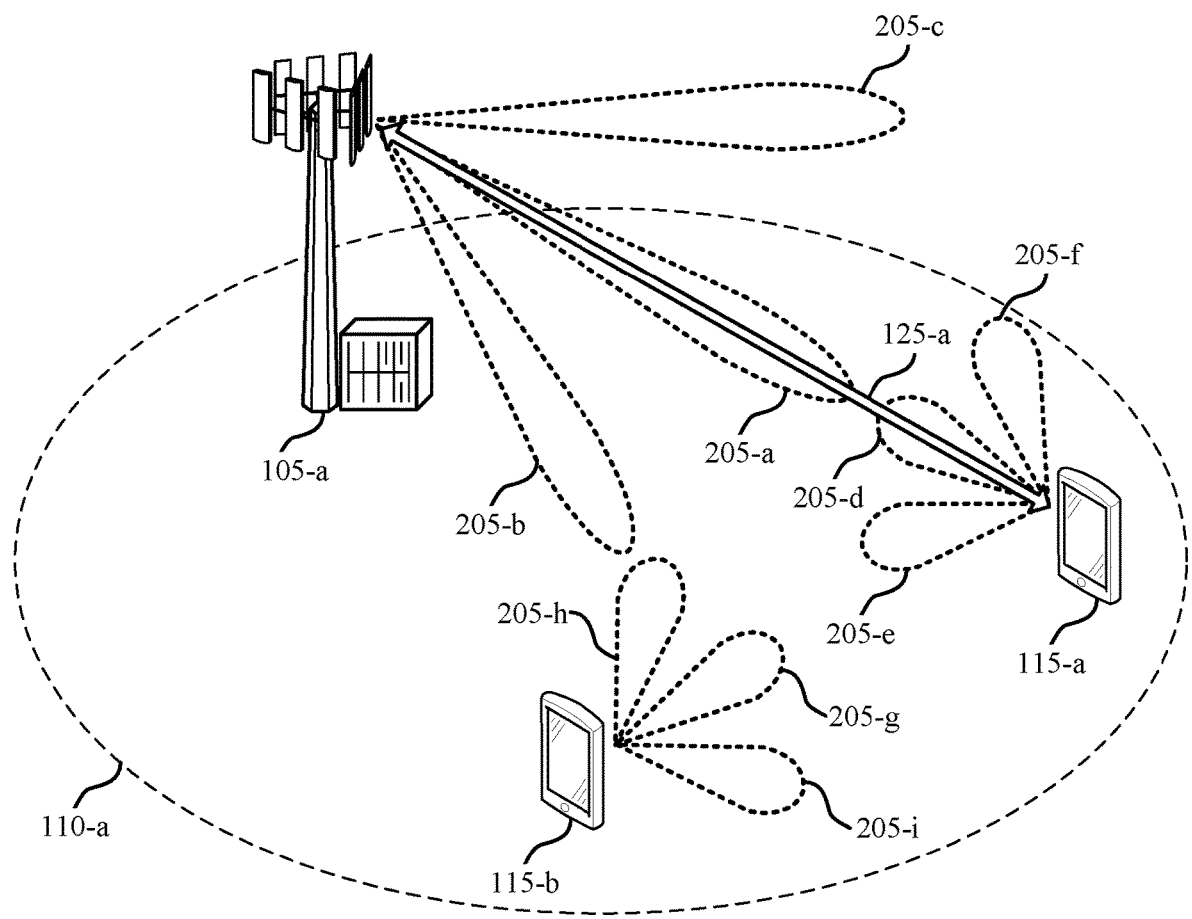

FIG. 2 illustrates an example of a wireless communications system 200 that supports CLI measurements with higher band operation in accordance with aspects of the present disclosure. In some examples, wireless communications system 200 may implement aspects of wireless communications system 100 and may include UE 115-a, UE 115-b, and base station 105-a with coverage area 110-a, which may be examples of UEs 115 and a base station 105 described with reference to FIG. 1. As described herein, base station 105-a may configure UE 115-a and UE 115-b with a measurement configuration for measuring interference (e.g., CLI) based on a directionality of one or more transmission beams, which may improve flexibility related to resource allocation.

In some examples, a base station 105 may transmit a message (e.g., including control information or data) using one or more beams 205 to one or more UEs 115 in a coverage area 110. The one or more UEs 115 may receive the transmission with a beam 205. For example, base station 105-a may send transmissions using one of beam 205-a, beam 205-b, or beam 205-c to one or more UEs 115 in coverage area 110-a (e.g., UE 115-a, UE 115-b, or both). UE 115-a may receive the transmission using one of beam 205-d, beam 205-e, or beam 205-f. Similarly, UE 115-b may receive the transmission using beam 205-g, beam 205-h, or beam 205-i. In some cases, base station 105-a and UE 115-a may establish communication link 125-a using beams 205-a and 205-d. However, one or more surrounding UEs 115 (e.g., UE 115-b) may create interference at communication link 125-a. For example, beam 205-g, beam 205-h, beam 205-i, or a combination may cause interference at communication link 125-a. This interference may be referred to as CLI.

In some cases, a UE 115 may measure interference and report the measurement to a base station 105 (e.g., to enable dynamic TDD across one or more base stations 105). For example, the UE 115 may measure parameters associated with a sounding reference signal (SRS) transmission (e.g., an SRS-reference signal received power (RSRP)) from one or more UEs 115 in a coverage area 110. Additionally or alternatively, the UE 115 may measure parameters associated with CLI (e.g., CLI-received signal strength indicator (RSSI)) from one or more UEs 115 in the coverage area 110. In some cases, the SRS RSRP may correspond to a linear average of the power contributions of one or more resource elements (e.g., time and frequency resources) carrying the SRS transmission. In some examples, the CLI RSSI may correspond to a linear average of the total received power in a symbol (e.g., an OFDM symbol) of one or more time resources configured by the base station 105. The CSI RSSI may account for interference from co-channel serving and non-serving base stations 105, adjacent channel interference, thermal noise, etc.

In some cases, the base station 105 may schedule resources according to the interference report from one or more UEs 115, which may improve efficiency and signaling overhead related to failed transmissions (e.g., by reducing interference). For example, base station 105-a may transmit an SRS configuration to UE 115-a, so UE 115-a may perform SRS RSRP measurements and report back to base station 105-a. In some examples, UE 115-a may measure the SRS RSRP over configured resource elements (e.g., specified in the SRS configuration) within a measurement frequency bandwidth in configured measurement time occasions. In some examples, base station 105-a may transmit a contiguous time and resource block grid, so UE 115-a may perform CLI RSSI measurements and report back to base station 105-a. In such examples, base station 105-a may send an information element or resource configuration for CLI RSSI measurements, which may include the number of physical resource blocks (PRBs), the start PRB index for sub-band indication, the number of OFDM symbols, the first OFDM symbol index in a slot, or a combination thereof. In some cases, the base station 105 may configure the UE 115 to apply layer 3 (L3) filtering to the measurement report to reduce, or prevent, unnecessary handover procedures (e.g., due to relatively low or high measurement reports). The UE 115 may include the SRS resource ID, the CLI RSSI resource ID, or both in the measurement report.

In some cases, the UE 115 may perform a measurement according to a measurement direction. For example, UE 115-a may perform an interference measurement related to interference from UE 115-b using one or more sets of antenna elements. In some cases, the UE 115-a may perform the interference measurement according to a quasi-colocation (QCL) configuration for the one or more sets of antenna elements. The QCL configuration may include spatial relation information or QCL information (e.g., according to a QCL type). For example, according to a particular QCL type, respective sets of antenna elements may share common beam characteristics, such as a beam direction, a beam width, a beam identifier, a spatial stream, and other like spatial parameters.

In some cases, the UE 115 may perform an SRS transmission for a CLI measurement. The timing advance (TA) value applied to an uplink symbol corresponding to the SRS transmission may be the similar to one or more TAs for different uplink symbols transmitted to the base station 105. In some cases, for SRS RSRP measurements, the UE 115 may apply a constant timing offset derived by implementation at the UE 115 (e.g., when compared with time tracking or other related time adjustment). In some cases, when the UE 115 performs a CLI RSSI measurement, the measurement timing may be determined by the UE 115 within OFDM symbols. The OFDM symbols may be configured for the CLI RSSI measurement. In some cases, the UE 115 may determine the QCL configuration.

In some examples, the UE 115 may assume a QCL configuration for an interference measurement (e.g., a CLI measurement). That is, the UE 115 may determine the QCL configuration for a CLI RSSI measurement, an SRS RSRP measurement, or both. For example, UE 115-a may use a QCL configuration for measuring a CLI with beam 205-d. UE 115-a may also receive a downlink signal from base station 105-a using the same QCL configuration (e.g., via communication link 125-a and beam 205-d). However, UE 115-a may not know which QCL configuration to implement if the downlink signal is in a different symbol than the CLI. Thus, when UE 115-a reports a CLI measurement (e.g., a CLI RSSI, an SRS RSRP, or both) to base station 105-a, base station 105-a may not know which QCL configuration UE 115-a implemented. In some examples, such as higher band operation (e.g., where UE 115-a may be equipped with multiple antenna elements and may use analog beamforming techniques), the QCL configuration UE 115-a implements may cause variation in the interference measurement, which may not be reflected in the report to base station 105-a (e.g., if UE 115-a does not include the QCL configuration used in the report). For example, if UE 115-a reports a relatively high CLI RSSI, SRS RSRP, or both, base station 105-a may not know which QCL configuration UE 115-a observed the relatively high interference on. Thus, improved techniques for CLI measurements with higher band operation are desired.

In some examples, wireless communications system 200 may support the use of techniques that enable CLI measurements with higher band operation, which may improve resource allocation and signaling overhead among other benefits. For example, a base station 105 may transmit a measurement configuration for measuring interference (e.g., CLI measurements) to a UE 115. In some cases, the measurement configuration may include a direction configuration for measuring the interference (e.g., a specified QCL configuration). In other cases, the UE 115 may select a measurement direction configuration for measuring the interference. For example, UE 115-a may receive a measurement configuration from base station 105-a via communication link 125-a. The measurement configuration may specify a QCL configuration associated with a beam 205 (e.g., beam 205-e or 205-d) on which to perform a CLI measurement (e.g., to determine interference from UE 115-b). In some cases, UE 115-a may select the QCL configuration associated with the beam 205.

The UE 115 may measure the interference (e.g., the CLI) for the beam 205 associated with the QCL configuration according to the measurement configuration. Additionally or alternatively, the UE 115 may select between one or more direction configurations and perform a CLI measurement, receive a downlink message, or both based on a priority rule (e.g., related to the CLI measurement, the downlink message, or both). In some cases, the UE 115 may report the measurement to the base station 105. For example, UE 115-a may report an interference measurement to base station 105-a. Base station 105-a may schedule UE 115-a with resources (e.g., time-frequency resources) based on the report. Base station 105-a and UE 115-a may communicate using the resources.

Figure 3:
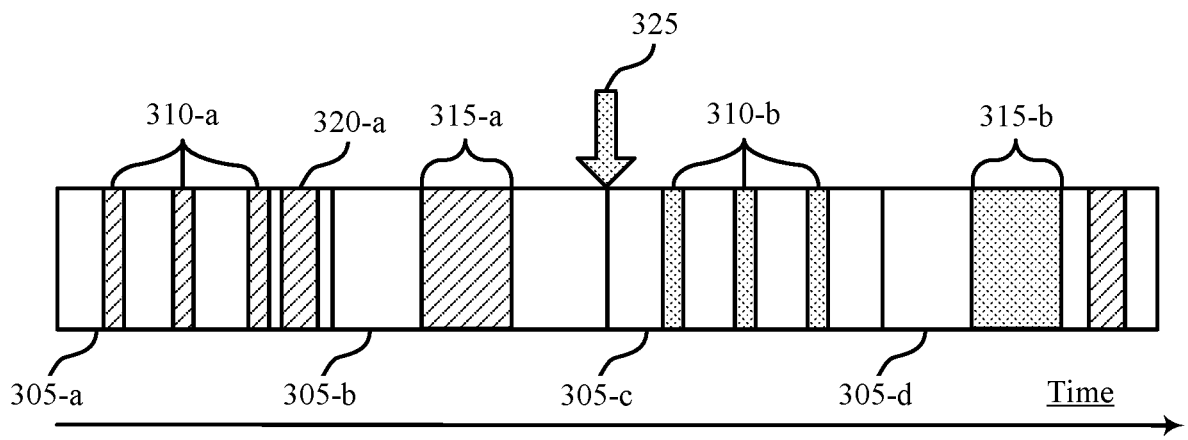
FIG. 3 illustrates an example of a timeline that supports measuring CLI in accordance with aspects of the present disclosure.

FIG. 3 illustrates an example of a timeline 300 that supports CLI measurements with higher band operation in accordance with aspects of the present disclosure. In some examples, timeline 300 may implement aspects of wireless communication system 100, wireless communication system 200, or both. Timeline 300 includes symbols 305 which may be transmitted and received by a base station 105, a UE 115, or both. For illustration purposes, timeline 300 includes symbol 305-a, symbol 305-b, symbol 305-c, and symbol 305-d, however there could be any number of symbols 305 in timeline 300. As described herein, the UE 115 may measure interference according to an SRS measurement configuration 310 (e.g., an SRS RSRP measurement configuration) or according to a CLI RSSI configuration 315 during a symbol 305 based on a measurement direction configuration (e.g., a QCL configuration), which may improve flexibility related to resource allocation.

In some cases, the base station 105 may transmit an interference measurement configuration, (e.g., a CLI measurement configuration) to UE 115, which may include a resource ID. The base station 105 may transmit the interference measurement configuration using a medium access control-control element (MAC-CE), downlink control information (DCI) signaling, or RRC signaling. In some examples, the interference measurement configuration may be an SRS measurement configuration 310, a CLI RSSI measurement configuration 315, or a combination thereof.

In some cases, the interference measurement configuration may indicate a corresponding TCI state. For example, the interference measurement configuration may include a measurement direction configuration, which may include one or more QCL configurations for one or more receive beams for interference measurements. In some examples, the one or more QCL configurations may be indicated for one or more resource IDs concurrently, which may reduce signaling overhead. For example, for a MAC-CE or DCI signal, the base station 105 may indicate new TCI states for one or more resource IDs. In some cases, the UE 115 may obtain the interference measurements according to the one or more QCL configurations. For example, the UE 115 may obtain interference measurements during symbol 305-a according to a first QCL configuration and an SRS measurement configuration 310-a. The UE 115 may obtain interference measurements during symbol 305-b according to the first QCL configuration and a CLI RSSI measurement configuration 315-a. Similarly, the UE 115 may obtain interference measurements during symbol 305-c and 305-d according to a second QCL configuration and an SRS measurement configuration 310-b and CLI RSSI measurement configuration 315-b respectively. In some cases, UE 115 may apply additional L3 filtering to the measurements. Subsequently, the UE 115 may transmit a report of the interference measurements for each of the one or more configured QCLs.

In some cases, the UE 115 may receive a downlink message 320 in addition, or as an alternative, to performing an interference measurement (e.g., a CLI measurement). For example, the UE 115 may receive a downlink message 320-a during symbol 305-a while performing interference measurements according to the SRS measurement configuration 310-a. In general, the UE 115 may measure CLI and perform a downlink reception in an overlapping time resource (e.g., a same OFDM symbol), but on different frequency resources. In some cases, the UE 115 may determine which QCL configuration to use based on a priority rule. For example, the UE 115 may prioritize the first QCL configuration during symbol 305-*a* for an interference measurement according to the SRS measurement configuration 310-*a*, which may affect the reception of downlink message 320-*a*. In such examples, the UE 115 may follow the TCI state indication signaled by the interference measurement. Alternatively, the UE 115 may prioritize the first QCL configuration during symbol 305-*a* for receiving downlink message 320-*a*. In such cases, the QCL configuration may not align with a QCL configuration for performing interference measurements during symbol 305-*a*. Thus, the UE 115 may refrain from performing the interference measurement. In some other cases, the UE 115 may perform the interference measurement with the beam used to receive downlink message 320-*a*.

In some cases, the base station 105 may receive the report of the interference measurements performed according to the priority rule from the UE 115. The report may include the resource ID from the interference measurement configuration. Thus, the base station 105 may determine an associated QCL configuration for each interference measurement. Subsequently, the base station 105 may determine the interference for the one or more configured QCLs and schedule resources (e.g., time-frequency resources) for one or more UEs 115 accordingly.

In some examples, the UE 115 may select a measurement direction configuration, such as one or more QCL configurations (e.g., rather than the base station 105 indicating the measurement direction configuration in the interference measurement configuration). The UE 115 may use the one or more QCL configurations to perform one or more interference measurements (e.g., CLI measurements). For example, the UE 115 may use a first QCL configuration during symbol 305-*a* and symbol 305-*b* to perform interference measurements according to SRS measurement configuration 310-*a* and CLI RSSI measurement configuration 315-*a*. At 325, the UE 115 may select the second QCL configuration to perform interference measurements during symbol 305-*c* and symbol 305-*d* according to SRS measurement configuration 310-*b* and CLI RSSI measurement configuration 315-*b*. In some cases, the UE 115 may apply L3 filtering to the one or more interference measurements. Subsequently, the UE 115 may report the one or more interference measurements to the base station 105.

In some cases, the UE 115 may include the QCL configurations used with corresponding interference measurement configuration resource ID in the report to the base station 105. In such cases, the UE 115 may update the QCL configuration (e.g., at 325) following a channel condition change, or based on other factors, and report the updated QCL configuration to the base station 105. Additionally or alternatively, the UE 115 may align the QCL configuration for interference measurement with a QCL configuration for a downlink message 320. For example, the UE 115 may use the select the first QCL configuration such that the UE 115 may use the first QCL configuration for interference measurements according to SRS measurement configuration 310-*a*, for downlink message 320-*a*, or both.

In some cases, the base station 105 and UE 115 may communicate the interference measurement configurations and interference measurements report according to MAC-CE or DCI signaling. For example, the base station 105 may use DCI (e.g., a CLI measurement trigger message within DCI) to trigger the UE 115 to perform one or more interference measurements and send the interference measurements report, which may account for variations in interference due to analog beams in higher band applications. Additionally or alternatively, the base station 105 may use a MAC-CE as an activation message to trigger the UE 115 to perform one or more interference measurements and send the interference measurement report.

Figure 4:
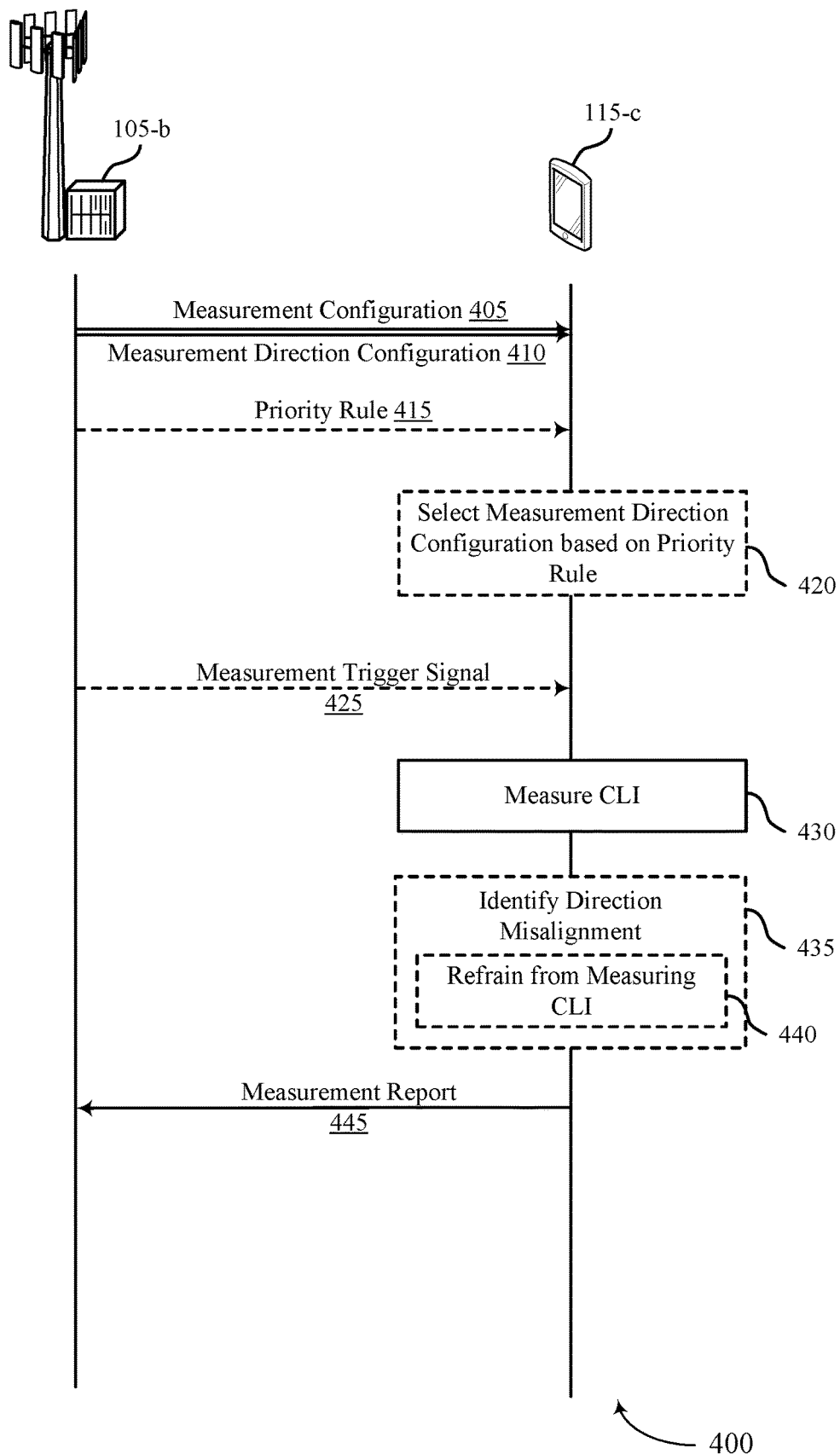
FIGS. 4 and 5 illustrate examples of process flows that support measuring CLI in accordance with aspects of the present disclosure.

FIG. 4 illustrates an example of a process flow 400 that supports CLI measurements with higher band operation in accordance with aspects of the present disclosure. In some examples, process flow 400 may implement aspects of wireless communication system 100, wireless communication system 200, and timeline 300. Process flow 400 includes UE 115-*c* and base station 105-*b*, which may be examples of a base station 105 and a UE 115 as described with reference to FIGS. 1 and 2. As described herein, UE 115-*c* may measure interference according to an interference measurement configuration from base station 105-*b* based on a measurement direction configuration (e.g., a QCL configuration), which may improve flexibility related to resource allocation. Alternative examples of the process flow 400 may be implemented, where some processes are performed in a different order than described or are not performed. In some cases, processes may include additional features not mentioned below, or further processes may be added.

At 405, base station 105-*b* may send a measurement configuration to UE 115-*c*. Base station 105-*b* may send the measurement configuration via RRC signaling, a MAC-CE, or DCI. In some cases, the measurement configuration may include an indication of a measurement direction configuration, such as a QCL configuration, shown at 410. In some cases, the measurement configuration may include an updated measurement direction configuration associated with one or more CLI resource IDs. In some examples, the measurement direction configuration may indicate a TCI indicating a receive beam direction for measuring interference (e.g., CLI). In some examples, UE 115-*c* may use the measurement configuration to measure interference.

At 415, base station 105-*b* may send a priority rule to UE 115-*c*. In some cases, UE 115-*c* may identify a time period (e.g., a symbol) scheduled for measuring the interference (e.g., CLI) and scheduled for receiving a downlink message. In some examples, UE 115-*c* may select between the measurement direction configuration received at 410 for measuring interference and a measurement direction configuration for receiving the downlink message based on a priority rule.

At 420, UE 115-*c* may select a measurement direction configuration based on the priority rule from base station 105-*b*. In some cases, the UE 115-*c* may prioritize the measurement direction configuration for measuring the interference (e.g., CLI) over the measurement direction configuration for measuring the downlink message. In some examples, UE 115-*c* may prioritize the measurement direction configuration for measuring the downlink message over the measurement direction configuration for measuring the interference.

At 425, base station 105-*b* may send a measurement trigger signal to UE 115-*c* (e.g., a CLI measurement activation message via a MAC-CE) or a CLI measurement trigger message via DCI). In some cases, UE 115-*c* may measure the interference (e.g., CLI) based on receiving the measurement trigger signal. For example, at 430, UE 115-*c* may measure the CLI based on the measurement configuration after receiving the measurement trigger signal at 425. In some cases, measuring the CLI may include measuring an SRS RSRP or a CLI RSSI. In some examples, UE 115-*c* may measure the interference and receive the downlink message during the symbol based on the priority rule.

At 435, UE 115-c may identify a direction misalignment between the measurement direction configuration for measuring the downlink message and the measurement direction configuration for measuring the interference (e.g., CLI). In some cases, at 440, UE 115-c may refrain from measuring the interference during the symbol based on identifying the direction misalignment.

At 445, UE 115-c may transmit a measurement report based on measuring the interference (e.g., CLI). In some cases, the UE 115-c may transmit the measurement report based on receiving the measurement trigger signal at 425.

Figure 5:
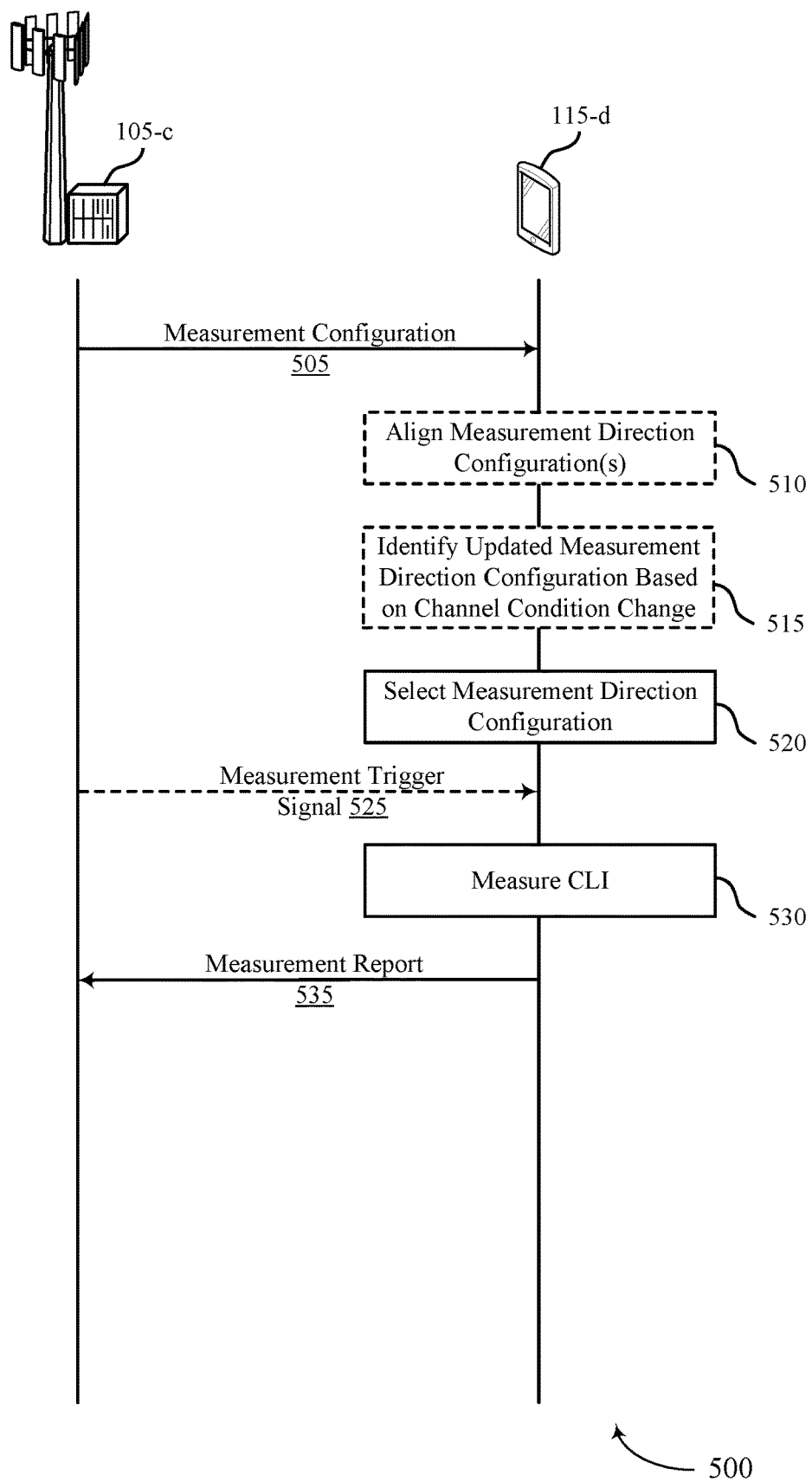

FIG. 5 illustrates an example of a process flow 500 that supports CLI measurements with higher band operation in accordance with aspects of the present disclosure. In some examples, process flow 500 may implement aspects of wireless communication system 100, wireless communication system 200, and timeline 300. Process flow 500 includes UE 115-d and base station 105-c, which may be examples of a base station 105 and a UE 115 as described with reference to FIGS. 1 and 2. As described herein, UE 115-d may measure interference according to an interference measurement configuration from base station 105-c based on a measurement direction configuration (e.g., a QCL configuration), which may improve flexibility related to resource allocation. Alternative examples of the process flow 500 may be implemented, where some processes are performed in a different order than described or are not performed. In some cases, processes may include additional features not mentioned below, or further processes may be added.

At 505, base station 105-c may send a measurement configuration to UE 115-d. In some cases, UE 115-d may use the measurement configuration for measuring interference (e.g., CLI). Base station 105-c may send the measurement configuration via RRC signaling, a MAC-CE, or DCI.

At 510, UE 115-d may align a first measurement direction configuration for measuring the interference (e.g., CLI) and a second measurement direction configuration for receiving a downlink message. In some cases, at 515, UE 115-d may identify an updated measurement direction configuration based on a channel condition change.

At 520, UE 115-d may select a measurement direction configuration, such as a QCL configuration, for measuring interference (e.g., CLI) based on the measurement configuration. In some examples, UE 115-d may select the measurement direction configuration for measuring interference based on the updated measurement direction configuration. In some cases, the measurement direction configuration may indicate a TCI indicating a receive beam direction for measuring interference (e.g., CLI).

At 525, base station 105-c may send a measurement trigger signal to UE 115-d. In some cases, UE 115-d may measure the interference (e.g., CLI) based on receiving the measurement trigger signal. For example, at 530, UE 115-d may measure the CLI based on the measurement configuration after receiving the measurement trigger signal at 525. In some cases, measuring the CLI may include measuring an SRS RSRP or a CLI RSSI.

At 535, UE 115-c may transmit a measurement report based on measuring the interference (e.g., CLI). In some cases, the UE 115-c may transmit the measurement report based on receiving the measurement trigger signal at 525. In some cases, the measurement report may include an indication of the measurement direction configuration selected for measuring the interference.

Figure 6:
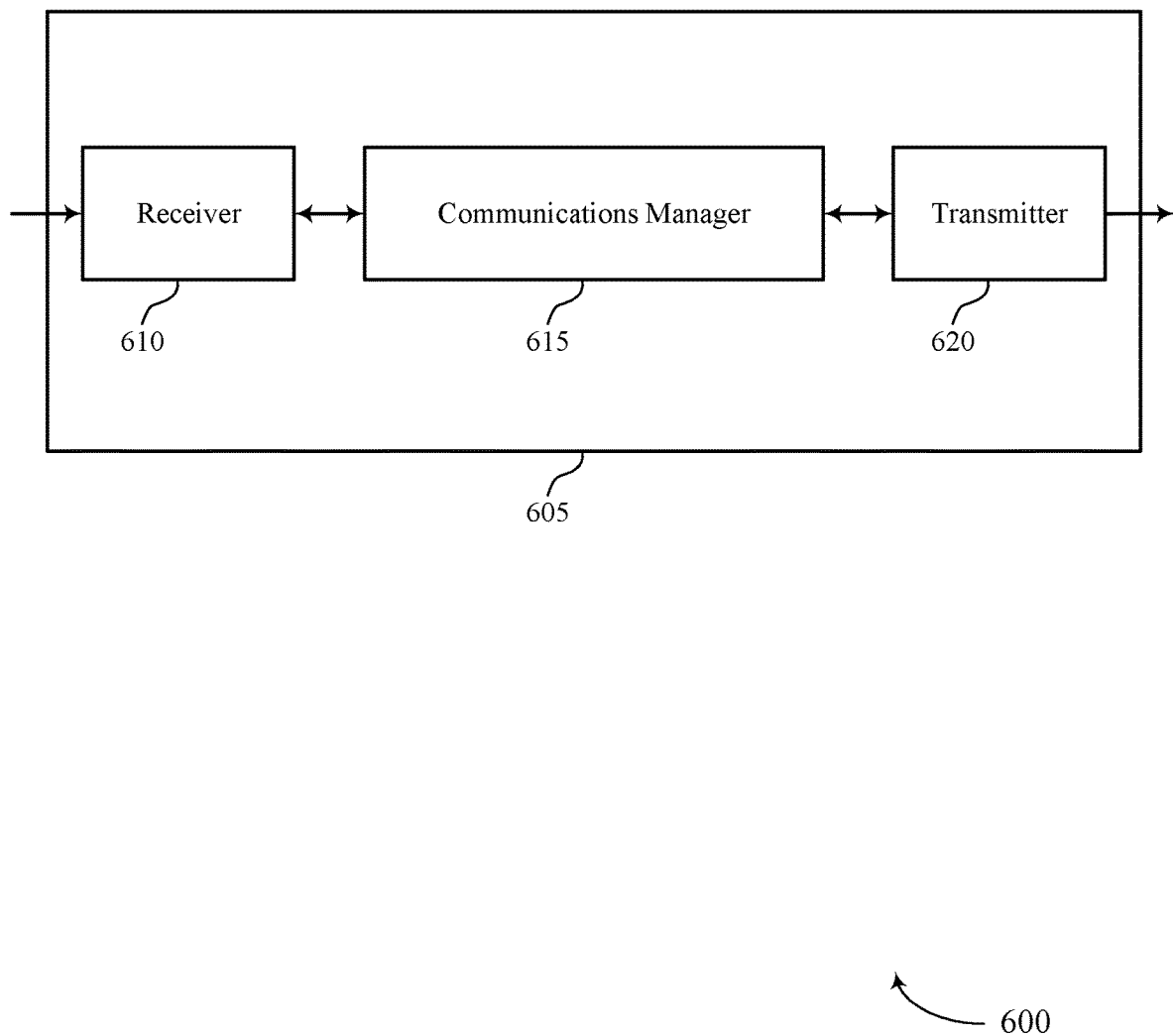
FIGS. 6 and 7 show block diagrams of devices that support measuring CLI in accordance with aspects of the present disclosure.

FIG. 6 shows a block diagram 600 of a device 605 that supports measuring CLI in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to measuring CLI, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive a measurement configuration for measuring CLI, where the measurement configuration indicates a measurement direction configuration for measuring the CLI, measure the CLI based on the measurement configuration, and transmit a measurement report based on measuring the CLI. The communications manager 615 may also receive a measurement configuration for measuring CLI, select a measurement direction configuration for measuring the CLI based on the measurement configuration, and transmit a measurement report based on measuring the CLI, where the measurement report indicates the measurement direction configuration selected for measuring the CLI. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signaling processor (DSP), an application-specific integrated circuit (ASIC), a field-programmable gate-array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
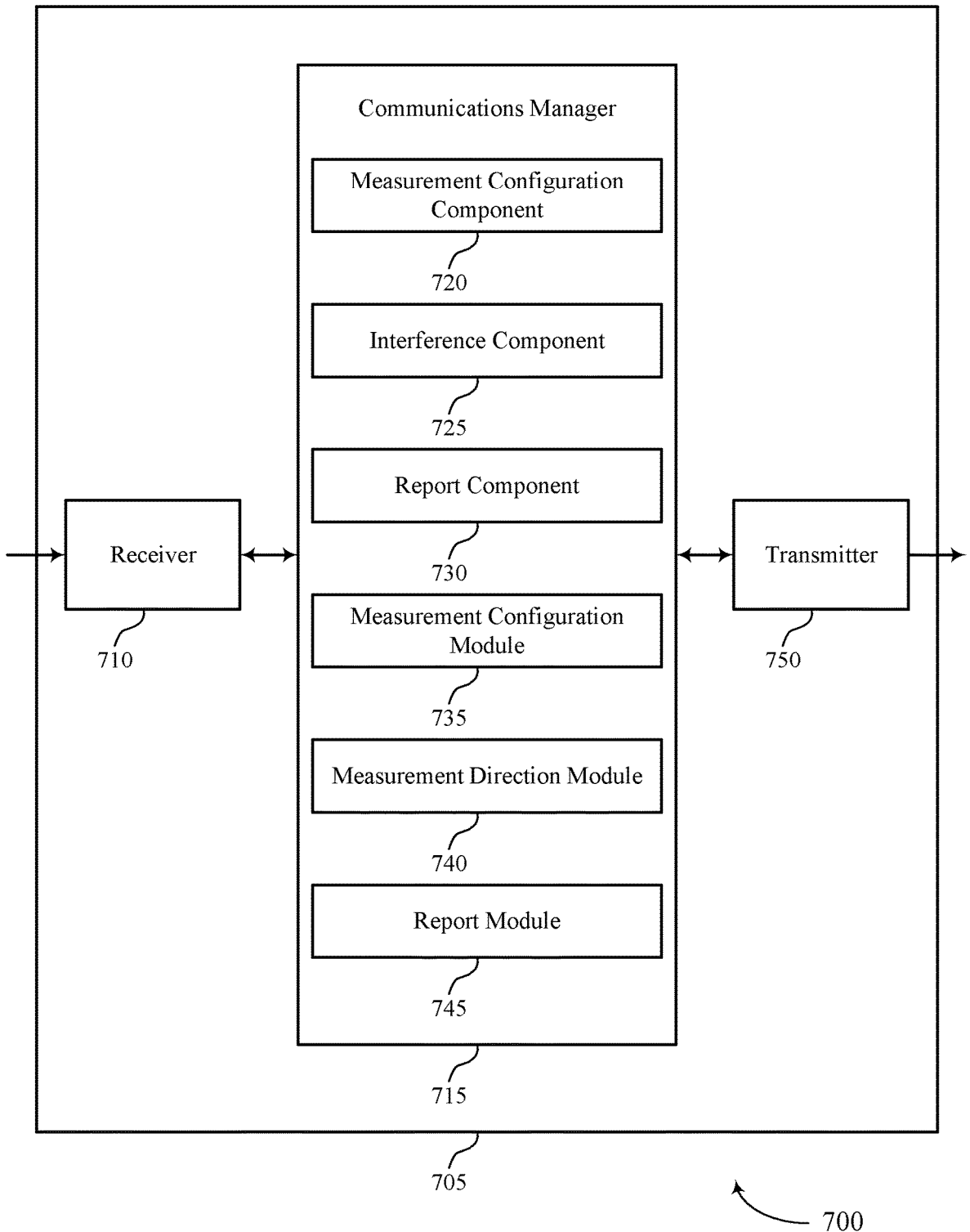

FIG. 7 shows a block diagram 700 of a device 705 that supports measuring CLI in accordance with aspects of the present disclosure. The device 705 may be an example of aspects of a device 605, or a UE 115 as described herein. The device 705 may include a receiver 710, a communications manager 715, and a transmitter 750. The device 705 may also include a processor. Each of these components may be in communication with one another (e.g., via one or more buses).

The receiver 710 may receive information such as packets, user data, or control information associated with various information channels (e.g., control channels, data channels, and information related to measuring CLI, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a measurement configuration component 720, an interference component 725, a report component 730, a measurement configuration module 735, a measurement direction module 740, and a report module 745. The communications manager 715 may be an example of aspects of the communications manager 910 described herein.

The actions performed by the communications manager 715 as described herein may be implemented to realize one or more potential advantages. One implementation may enable a base station to transmit a measurement configuration for measuring interference to a UE. Such indications may include a measurement direction configuration, or may enable a UE to select a measurement direction configuration, which may result in higher data rates and more efficient communications (e.g., less communication errors), among other advantages.

Based on implementing the indications as described herein, a processor of a UE or base station (e.g., a processor controlling the receiver 710, the communications manager 715, the transmitter 750, or a combination thereof) may reduce the impact or likelihood of interference in a communications system while ensuring relatively efficient communications. For example, the reporting techniques described herein may leverage a priority rule, or selection by the UE, for one or more measurement direction configurations, which may realize reduced signaling overhead and power savings, among other benefits.

The measurement configuration component 720 may receive a measurement configuration for measuring CLI, where the measurement configuration indicates a measurement direction configuration for measuring the CLI. The interference component 725 may measure the CLI based on the measurement configuration. The report component 730 may transmit a measurement report based on measuring the CLI.

The measurement configuration module 735 may receive a measurement configuration for measuring CLI. The measurement direction module 740 may select a measurement direction configuration for measuring the CLI based on the measurement configuration. The report module 745 may transmit a measurement report based on measuring the CLI, where the measurement report indicates the measurement direction configuration selected for measuring the CLI.

The transmitter 750 may transmit signals generated by other components of the device 705. In some examples, the transmitter 750 may be collocated with a receiver 710 in a transceiver module. For example, the transmitter 750 may be an example of aspects of the transceiver 920 described with reference to FIG. 9. The transmitter 750 may utilize a single antenna or a set of antennas.

Figure 8:
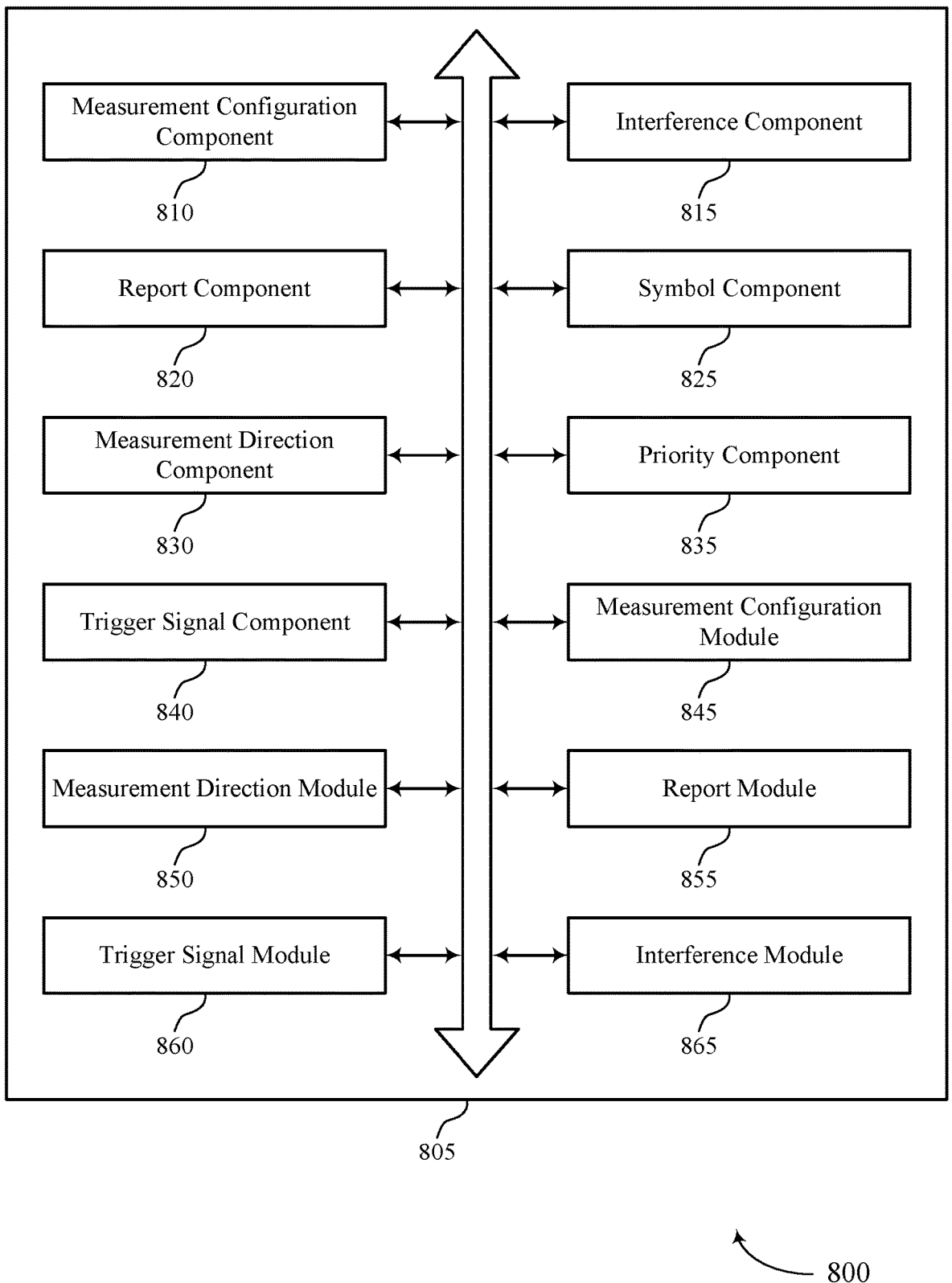
FIG. 8 shows a block diagram of a communications manager that supports measuring CLI in accordance with aspects of the present disclosure.

FIG. 8 shows a block diagram 800 of a communications manager 805 that supports measuring CLI in accordance with aspects of the present disclosure. The communications manager 805 may be an example of aspects of a communications manager 615, a communications manager 715, or a communications manager 910 described herein. The communications manager 805 may include a measurement configuration component 810, an interference component 815, a report component 820, a symbol component 825, a measurement direction component 830, a priority component 835, a trigger signal component 840, a measurement configuration module 845, a measurement direction module 850, a report module 855, a trigger signal module 860, and an interference module 865. Each of these modules may communicate, directly or indirectly, with one another (e.g., via one or more buses).

The measurement configuration component 810 may receive a measurement configuration for measuring CLI, where the measurement configuration indicates a measurement direction configuration for measuring the CLI. In some cases, the measurement configuration for measuring the CLI includes RRC signaling, a MAC-CE, or DCI. In some cases, the measurement configuration for measuring the CLI further includes an updated measurement direction configuration associated with a set of CLI resource IDs. The interference component 815 may measure the CLI based on the measurement configuration.

In some examples, the interference component 815 may measure the CLI and receiving the downlink message during the time period based on the priority rule. In some examples, the interference component 815 may refrain from measuring the CLI during the time period based on identifying the direction misalignment. In some examples, the interference component 815 may measure a sounding reference signal reference signal received power or a CLI received signal strength indicator. The report component 820 may transmit a measurement report based on measuring the CLI.

The measurement configuration module 845 may receive a measurement configuration for measuring CLI. In some cases, the measurement configuration for measuring the CLI includes RRC signaling, a MAC-CE, or DCI. The measurement direction module 850 may select a measurement direction configuration for measuring the CLI based on the measurement configuration. In some examples, the measurement direction module 850 may align a first measurement direction configuration for measuring the CLI and a second measurement direction configuration for receiving a downlink message. In some examples, the measurement direction module 850 may identify an updated measurement direction configuration based on a channel condition change, the measurement direction configuration selected for measuring the CLI is based on the updated measurement direction configuration.

In some cases, the measurement direction configuration selected for measuring the CLI indicates a transmission configuration indication indicating a receive beam direction for measuring the CLI. In some cases, the measurement direction configuration selected for measuring the CLI indicates a QCL configuration.

The report module 855 may transmit a measurement report based on measuring the CLI, where the measurement report indicates the measurement direction configuration selected for measuring the CLI. The symbol component 825 may identify a time period scheduled for measuring the CLI and scheduled for receiving a downlink message.

The measurement direction component 830 may select between the measurement direction configuration for measuring the CLI and a measurement direction configuration for receiving the downlink message based on a priority rule. In some examples, the measurement direction component 830 may identify a direction misalignment between the measurement direction configuration for measuring the downlink message and the measurement direction configuration for measuring the CLI. In some cases, the measurement direction configuration for measuring the CLI indicates a transmission configuration indication indicating a receive beam direction for measuring the CLI. In some cases, the measurement direction configuration for measuring the CLI indicates a QCL configuration.

The priority component 835 may prioritize the measurement direction configuration for measuring the CLI over the measurement direction configuration for measuring the downlink message. In some cases, the priority component 835 may prioritize the measurement direction configuration for measuring the downlink message over the measurement direction configuration for measuring the CLI.

The trigger signal component 840 may receive a measurement trigger signal, where measuring the CLI, transmitting the measurement report, or both, are based on the measurement trigger signal. The trigger signal module 860 may receive a measurement trigger signal, where measuring the CLI, transmitting the measurement report, or both, are based on the measurement trigger signal. The interference module 865 may measure a sounding reference signal reference signal received power or a CLI received signal strength indicator.

Figure 9:
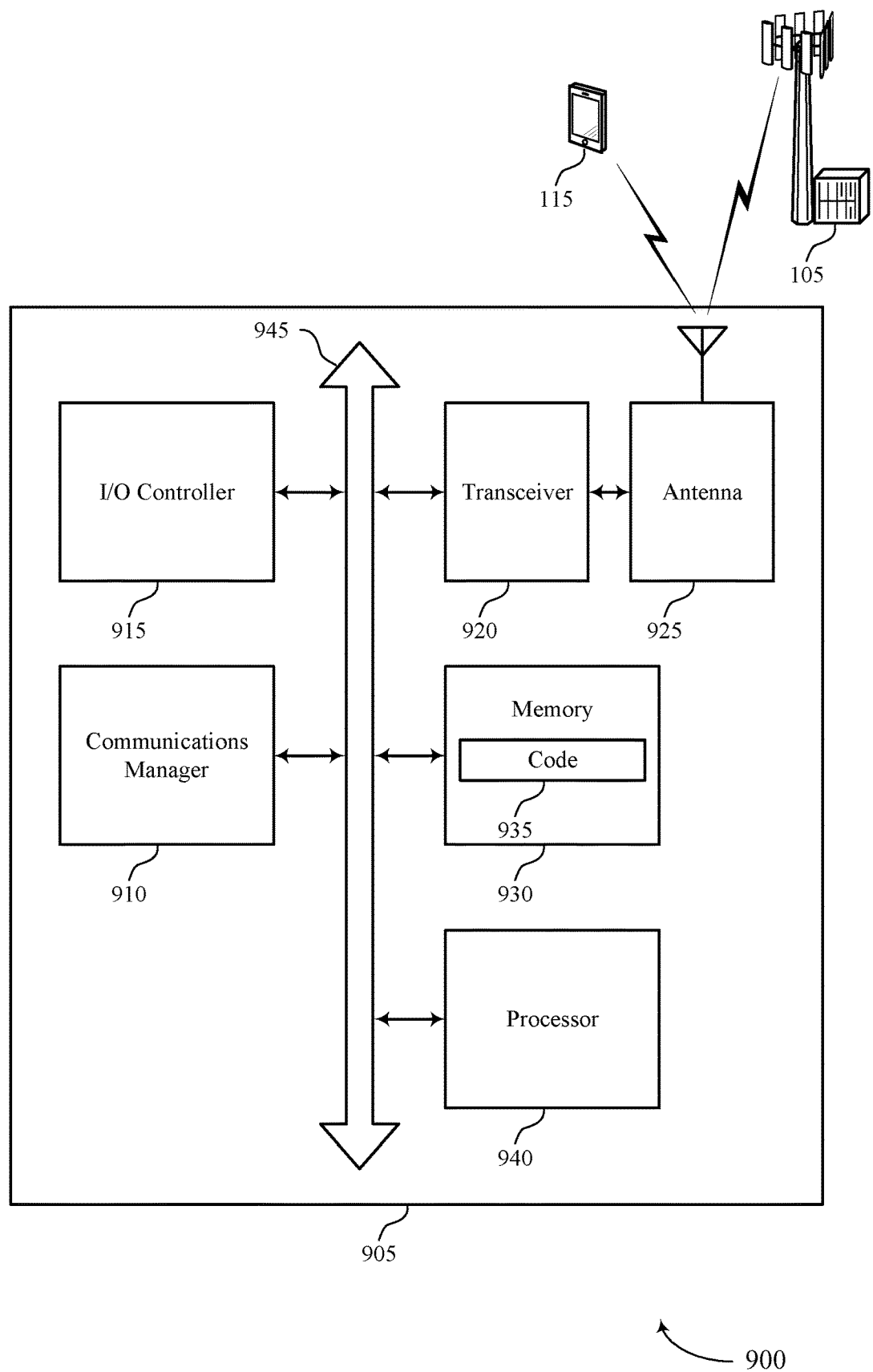
FIG. 9 shows a diagram of a system including a device that supports measuring CLI in accordance with aspects of the present disclosure.

FIG. 9 shows a diagram of a system 900 including a device 905 that supports measuring CLI in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive a measurement configuration for measuring CLI, where the measurement configuration indicates a measurement direction configuration for measuring the CLI, measure the CLI based on the measurement configuration, and transmit a measurement report based on measuring the CLI. The communications manager 910 may also receive a measurement configuration for measuring CLI, select a measurement direction configuration for measuring the CLI based on the measurement configuration, and transmit a measurement report based on measuring the CLI, where the measurement report indicates the measurement direction configuration selected for measuring the CLI.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting measuring CLI).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
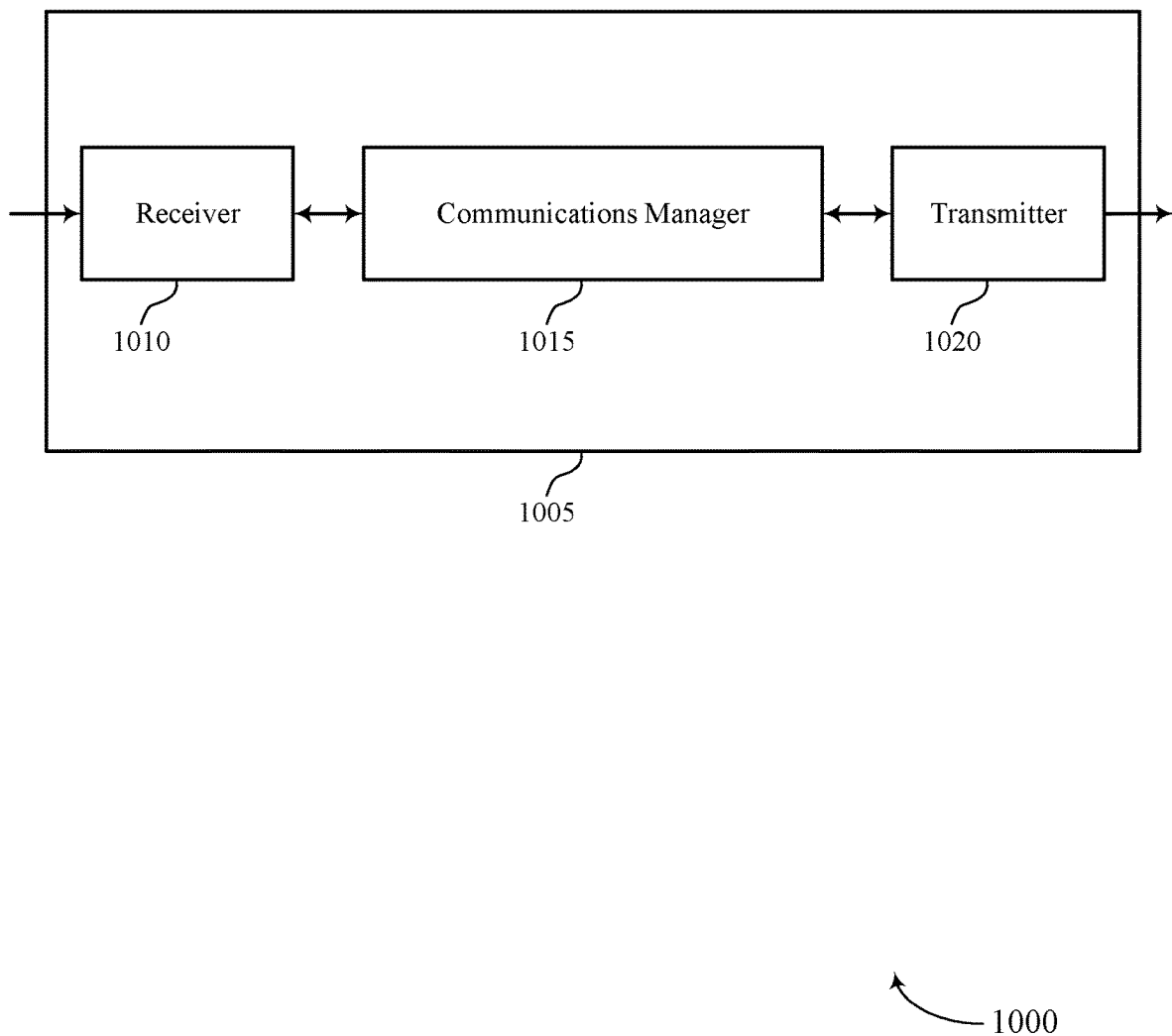
FIGS. 10 and 11 show block diagrams of devices that support measuring CLI in accordance with aspects of the present disclosure.

FIG. 10 shows a block diagram 1000 of a device 1005 that supports measuring CLI in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to measuring CLI, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit a measurement configuration to a UE for measuring CLI, where the measurement configuration indicates a measurement direction configuration for measuring the CLI and receive a measurement report indicating a measurement of the CLI based on the measurement configuration. The communications manager 1015 may also transmit a measurement configuration to a UE for measuring CLI and receive a measurement report indicating a measurement of the CLI based on the measurement configuration, where the measurement report indicates a measurement direction configuration selected by the UE for measuring the CLI. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
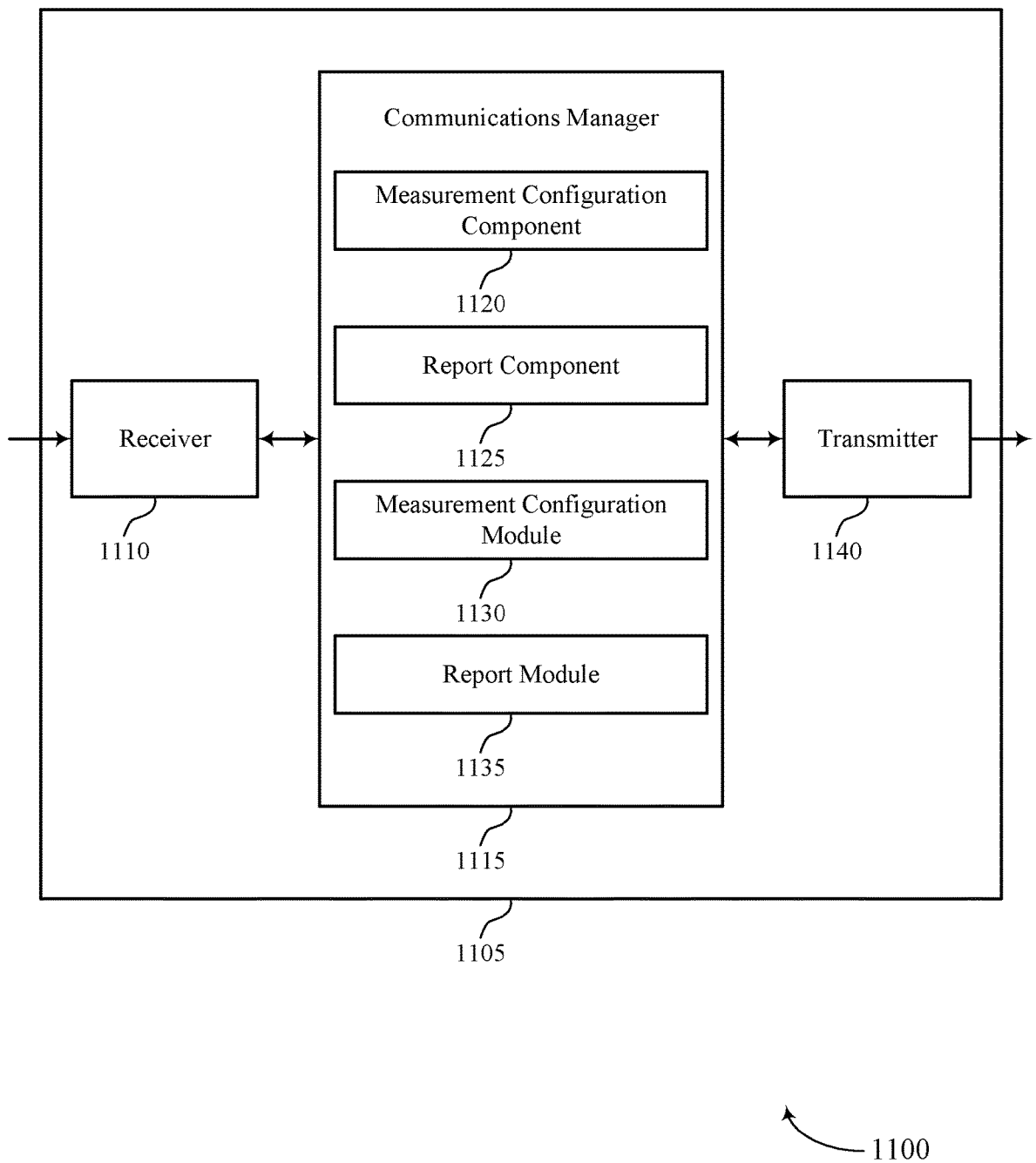

FIG. 11 shows a block diagram 1100 of a device 1105 that supports measuring CLI in accordance with aspects of the present disclosure. The device 1105 may be an example of aspects of a device 1005, or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to measuring CLI, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a measurement configuration component 1120, a report component 1125, a measurement configuration module 1130, and a report module 1135. The communications manager 1115 may be an example of aspects of the communications manager 1310 described herein.

The measurement configuration component 1120 may transmit a measurement configuration to a UE for measuring CLI, where the measurement configuration indicates a measurement direction configuration for measuring the CLI. The report component 1125 may receive a measurement report indicating a measurement of the CLI based on the measurement configuration. The measurement configuration module 1130 may transmit a measurement configuration to a UE for measuring CLI. The report module 1135 may receive a measurement report indicating a measurement of the CLI based on the measurement configuration, where the measurement report indicates a measurement direction configuration selected by the UE for measuring the CLI.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
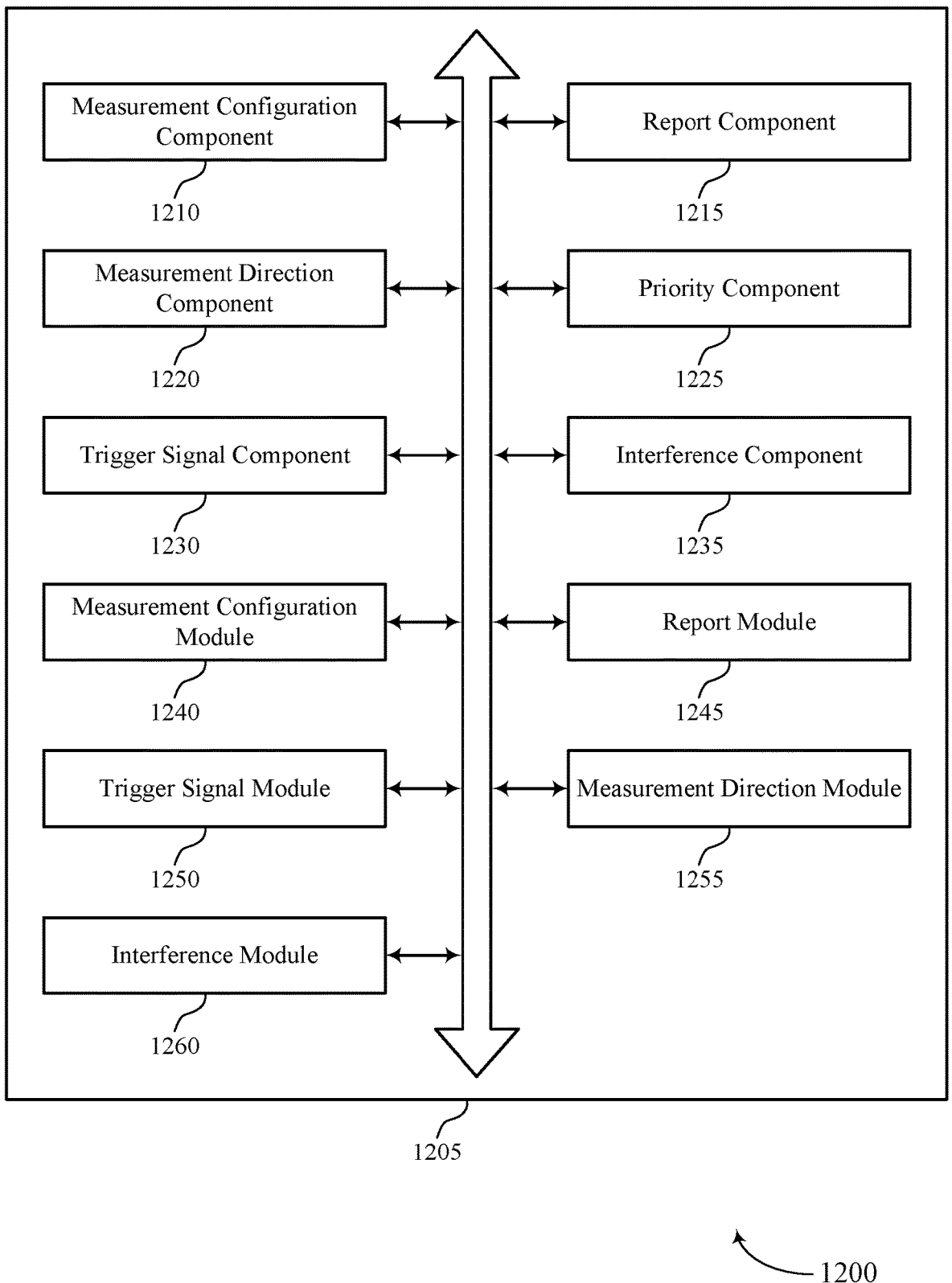
FIG. 12 shows a block diagram of a communications manager that supports measuring CLI in accordance with aspects of the present disclosure.

FIG. 12 shows a block diagram 1200 of a communications manager 1205 that supports measuring CLI in accordance with aspects of the present disclosure. The communications manager 1205 may be an example of aspects of a communications manager 1015, a communications manager 1115, or a communications manager 1310 described herein. The communications manager 1205 may include a measurement configuration component 1210, a report component 1215, a measurement direction component 1220, a priority component 1225, a trigger signal component 1230, an interference component 1235, a measurement configuration module 1240, a report module 1245, a trigger signal module 1250, a measurement direction module 1255, and an interference module 1260. Each of these modules may communicate, directly or indirectly, with one another (e.g., via one or more buses).

The measurement configuration component 1210 may transmit a measurement configuration to a UE for measuring CLI, where the measurement configuration indicates a measurement direction configuration for measuring the CLI. In some cases, the measurement configuration for measuring the CLI includes RRC signaling, a MAC-CE, or DCI.

The report component 1215 may receive a measurement report indicating a measurement of the CLI based on the measurement configuration. The measurement configuration module 1240 may transmit a measurement configuration to a UE for measuring CLI. The report module 1245 may receive a measurement report indicating a measurement of the CLI based on the measurement configuration, where the measurement report indicates a measurement direction configuration selected by the UE for measuring the CLI.

The measurement direction component 1220 may transmit an indication of a measurement direction configuration for receiving a downlink message. In some cases, the measurement direction configuration for measuring the CLI indicates a transmission configuration indication indicating a receive beam direction for measuring the CLI. In some cases, the measurement direction configuration for measuring the CLI indicates a QCL configuration.

The priority component 1225 may transmit an indication of a priority rule for selecting between the measurement direction configuration for measuring the CLI and the measurement direction configuration for receiving the downlink message. In some cases, the priority rule prioritizes the measurement direction configuration for measuring the CLI over the measurement direction configuration for measuring the downlink message. In some cases, the priority rule prioritizes the measurement direction configuration for measuring the downlink message over the measurement direction configuration for measuring the CLI.

The trigger signal component 1230 may transmit a measurement trigger signal, where receiving the measurement report is based on the measurement trigger signal. The interference component 1235 may measure the CLI, which may include an SRS RSRP measurement or a CLI RSSI measurement.

The trigger signal module 1250 may transmit a measurement trigger signal, where receiving the measurement report is based on the measurement trigger signal. The measurement direction module 1255 may select a measurement direction configuration for measuring the CLI indicates a transmission configuration indication indicating a receive beam direction for measuring the CLI.

Figure 13:
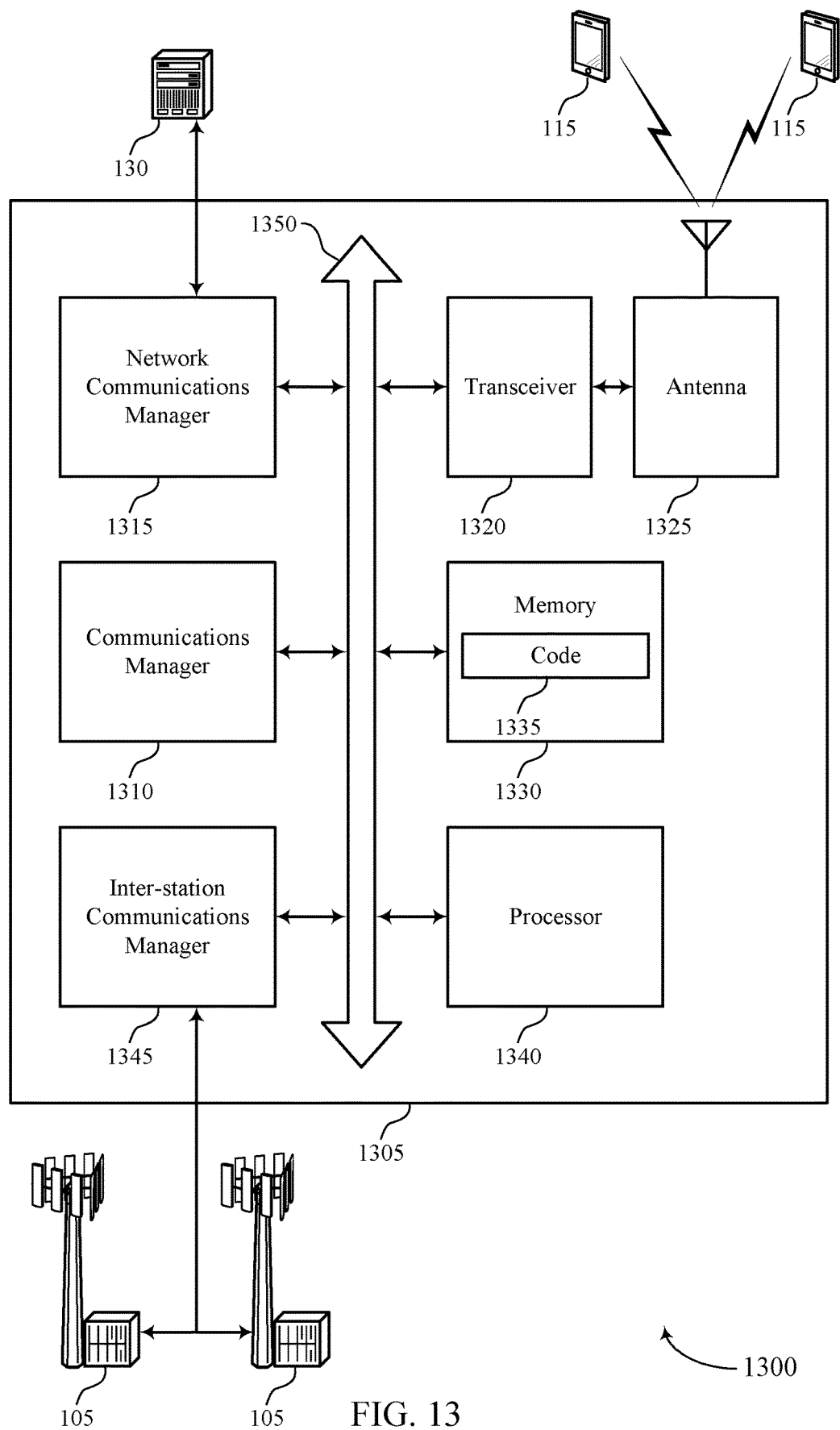
FIG. 13 shows a diagram of a system including a device that supports measuring CLI in accordance with aspects of the present disclosure.

FIG. 13 shows a diagram of a system 1300 including a device 1305 that supports measuring CLI in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit a measurement configuration to a UE for measuring CLI, where the measurement configuration indicates a measurement direction configuration for measuring the CLI and receive a measurement report indicating a measurement of the CLI based on the measurement configuration. The communications manager 1310 may also transmit a measurement configuration to a UE for measuring CLI and receive a measurement report indicating a measurement of the CLI based on the measurement configuration, where the measurement report indicates a measurement direction configuration selected by the UE for measuring the CLI.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting measuring CLI).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
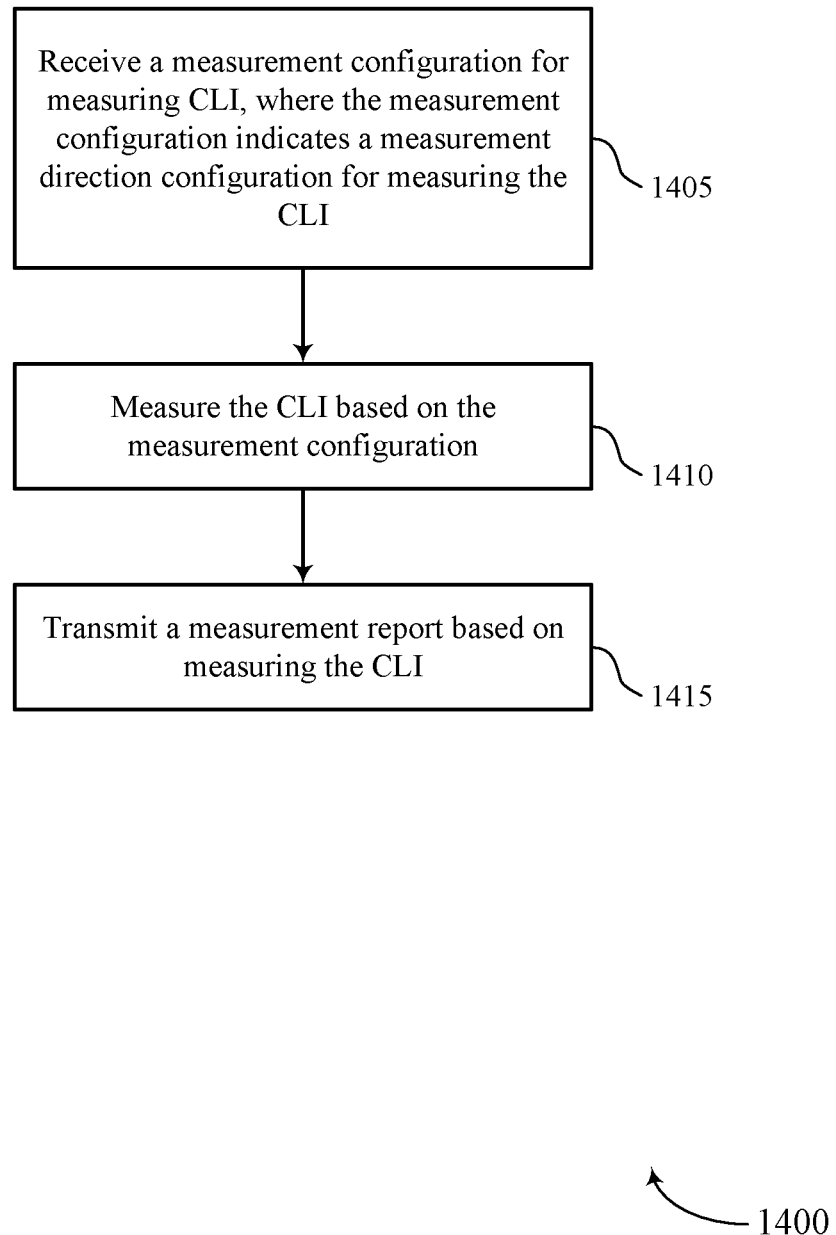
FIGS. 14 through 20 show flowcharts illustrating methods that support measuring CLI in accordance with aspects of the present disclosure.

FIG. 14 shows a flowchart illustrating a method 1400 that supports measuring CLI in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive a measurement configuration for measuring CLI, where the measurement configuration indicates a measurement direction configuration for measuring the CLI. The operations of 1405 may be performed according to the methods described herein. In some examples, aspects of the operations of 1405 may be performed by a measurement configuration component as described with reference to FIGS. 6 through 9.

At 1410, the UE may measure the CLI based on the measurement configuration. The operations of 1410 may be performed according to the methods described herein. In some examples, aspects of the operations of 1410 may be performed by an interference component as described with reference to FIGS. 6 through 9.

At 1415, the UE may transmit a measurement report based on measuring the CLI. The operations of 1415 may be performed according to the methods described herein. In some examples, aspects of the operations of 1415 may be performed by a report component as described with reference to FIGS. 6 through 9.

Figure 15:
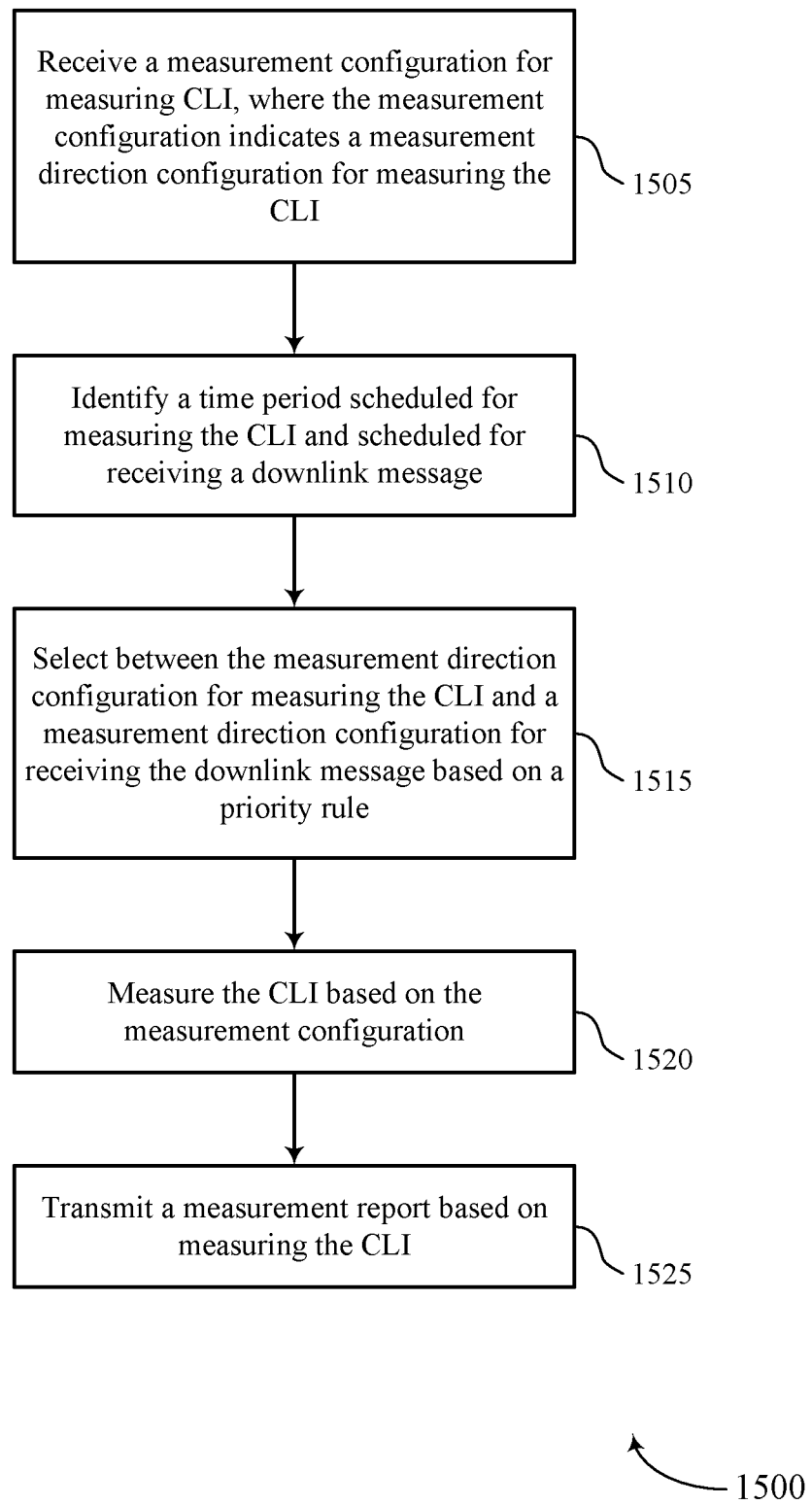

FIG. 15 shows a flowchart illustrating a method 1500 that supports measuring CLI in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive a measurement configuration for measuring CLI, where the measurement configuration indicates a measurement direction configuration for measuring the CLI. The operations of 1505 may be performed according to the methods described herein. In some examples, aspects of the operations of 1505 may be performed by a measurement configuration component as described with reference to FIGS. 6 through 9.

At 1510, the UE may identify a time period scheduled for measuring the CLI and scheduled for receiving a downlink message. The operations of 1510 may be performed according to the methods described herein. In some examples, aspects of the operations of 1510 may be performed by a symbol component as described with reference to FIGS. 6 through 9.

At 1515, the UE may select between the measurement direction configuration for measuring the CLI and a measurement direction configuration for receiving the downlink message based on a priority rule. The operations of 1515 may be performed according to the methods described herein. In some examples, aspects of the operations of 1515 may be performed by a measurement direction component as described with reference to FIGS. 6 through 9.

At 1520, the UE may measure the CLI based on the measurement configuration. The operations of 1520 may be performed according to the methods described herein. In some examples, aspects of the operations of 1520 may be performed by an interference component as described with reference to FIGS. 6 through 9.

At 1525, the UE may transmit a measurement report based on measuring the CLI. The operations of 1525 may be performed according to the methods described herein. In some examples, aspects of the operations of 1525 may be performed by a report component as described with reference to FIGS. 6 through 9.

Figure 16:
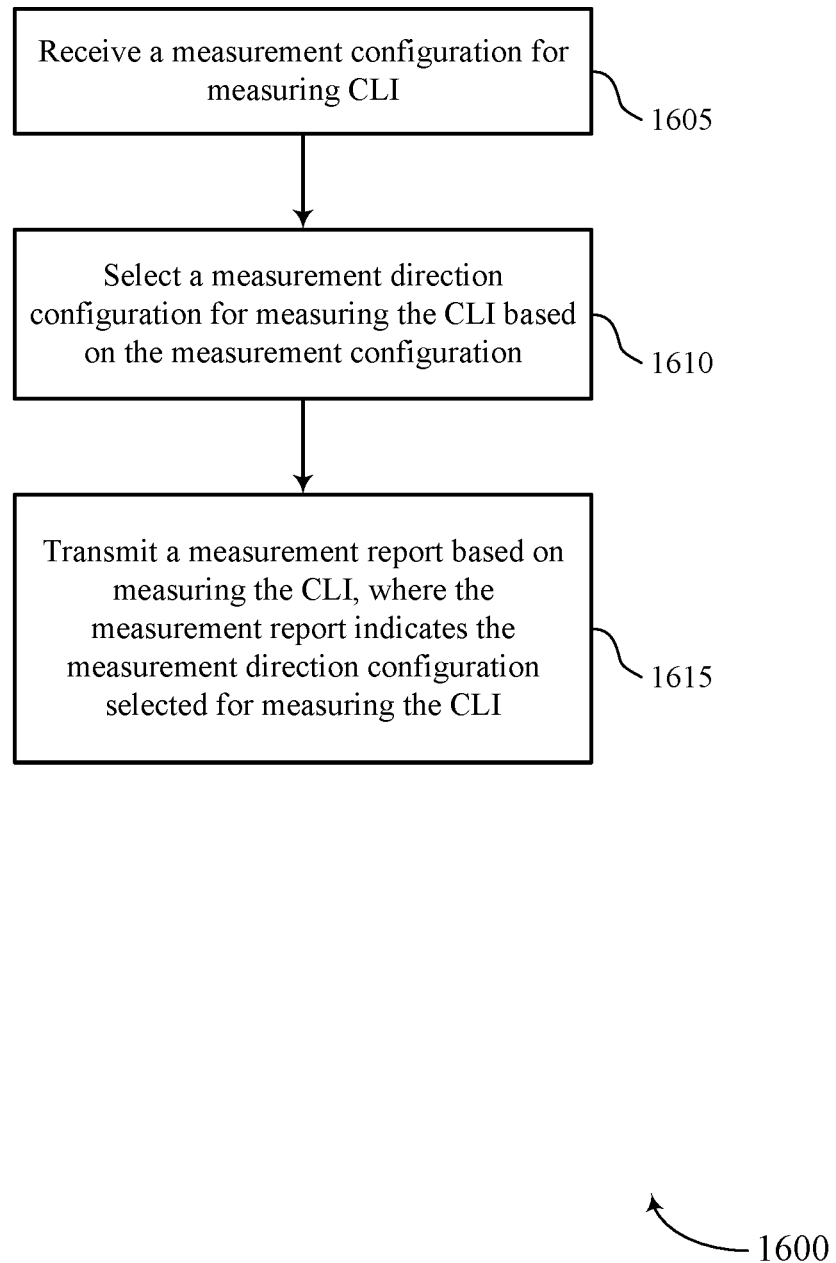

FIG. 16 shows a flowchart illustrating a method 1600 that supports measuring CLI in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive a measurement configuration for measuring CLI. The operations of 1605 may be performed according to the methods described herein. In some examples, aspects of the operations of 1605 may be performed by a measurement configuration module as described with reference to FIGS. 6 through 9.

At 1610, the UE may select a measurement direction configuration for measuring the CLI based on the measurement configuration. The operations of 1610 may be performed according to the methods described herein. In some examples, aspects of the operations of 1610 may be performed by a measurement direction module as described with reference to FIGS. 6 through 9.

At 1615, the UE may transmit a measurement report based on measuring the CLI, where the measurement report indicates the measurement direction configuration selected for measuring the CLI. The operations of 1615 may be performed according to the methods described herein. In some examples, aspects of the operations of 1615 may be performed by a report module as described with reference to FIGS. 6 through 9.

Figure 17:
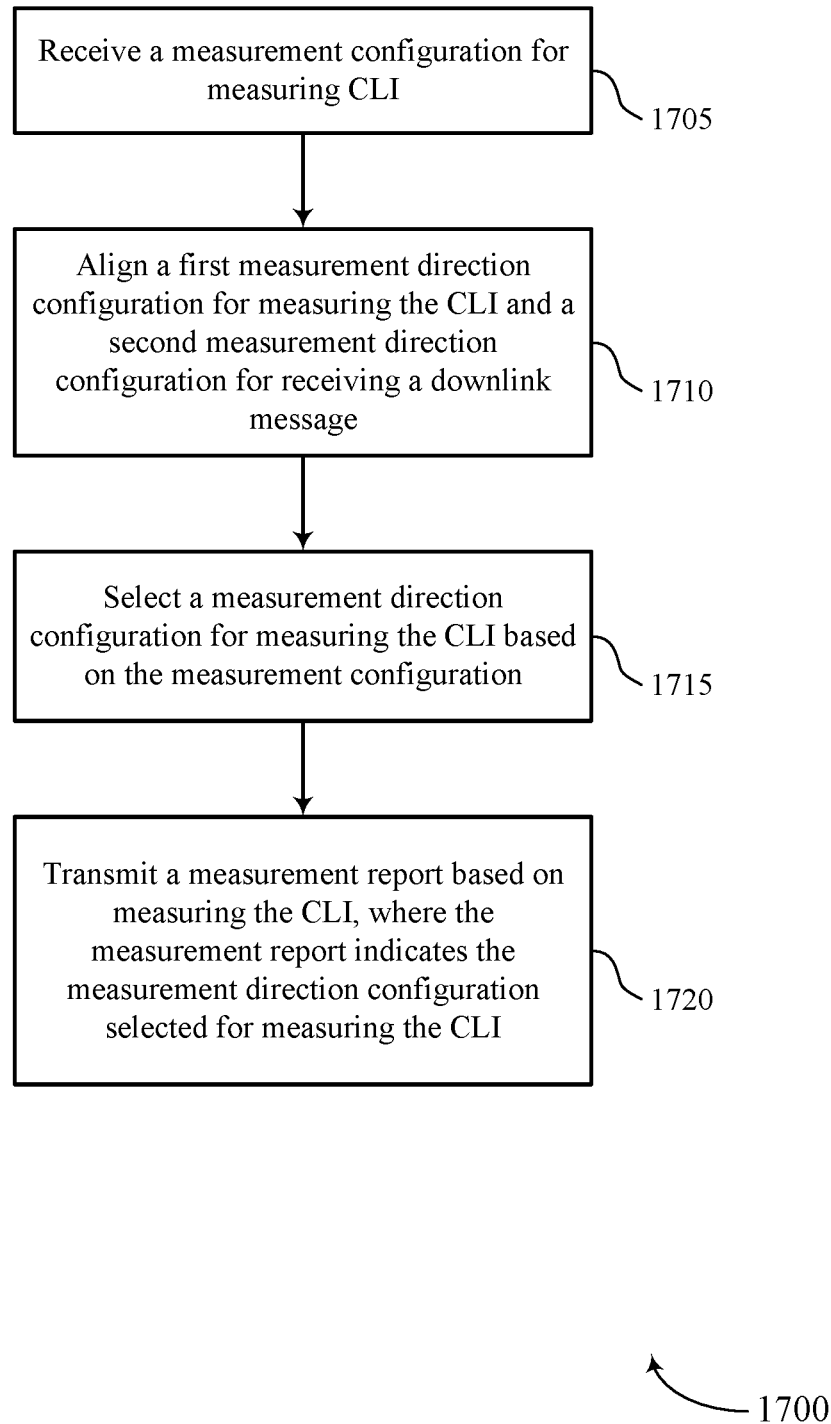

FIG. 17 shows a flowchart illustrating a method 1700 that supports measuring CLI in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may receive a measurement configuration for measuring CLI. The operations of 1705 may be performed according to the methods described herein. In some examples, aspects of the operations of 1705 may be performed by a measurement configuration module as described with reference to FIGS. 6 through 9.

At 1710, the UE may align a first measurement direction configuration for measuring the CLI and a second measurement direction configuration for receiving a downlink message. The operations of 1710 may be performed according to the methods described herein. In some examples, aspects of the operations of 1710 may be performed by a measurement direction module as described with reference to FIGS. 6 through 9.

At 1715, the UE may select a measurement direction configuration for measuring the CLI based on the measurement configuration. The operations of 1715 may be performed according to the methods described herein. In some examples, aspects of the operations of 1715 may be performed by a measurement direction module as described with reference to FIGS. 6 through 9.

At 1720, the UE may transmit a measurement report based on measuring the CLI, where the measurement report indicates the measurement direction configuration selected for measuring the CLI. The operations of 1720 may be performed according to the methods described herein. In some examples, aspects of the operations of 1720 may be performed by a report module as described with reference to FIGS. 6 through 9.

Figure 18:
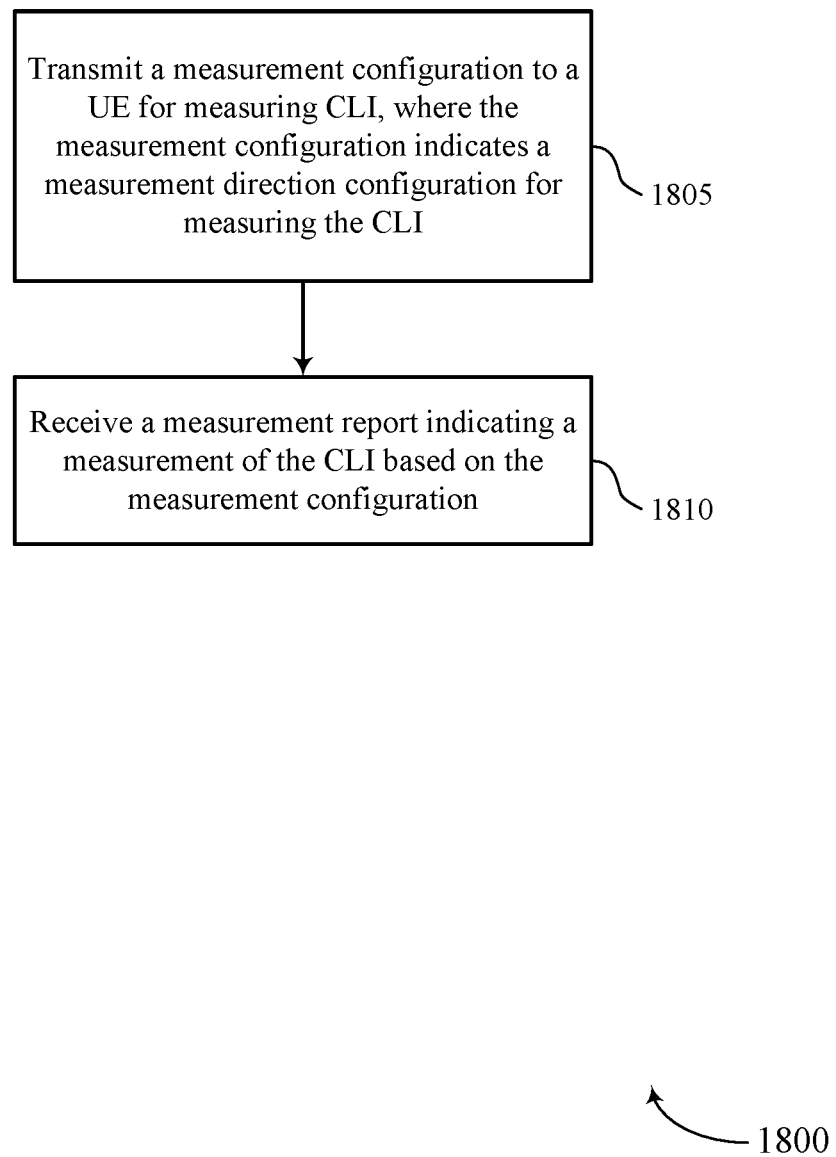

FIG. 18 shows a flowchart illustrating a method 1800 that supports measuring CLI in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may transmit a measurement configuration to a UE for measuring CLI, where the measurement configuration indicates a measurement direction configuration for measuring the CLI. The operations of 1805 may be performed according to the methods described herein. In some examples, aspects of the operations of 1805 may be performed by a measurement configuration component as described with reference to FIGS. 10 through 13.

At 1810, the base station may receive a measurement report indicating a measurement of the CLI based on the measurement configuration. The operations of 1810 may be performed according to the methods described herein. In some examples, aspects of the operations of 1810 may be performed by a report component as described with reference to FIGS. 10 through 13.

Figure 19:
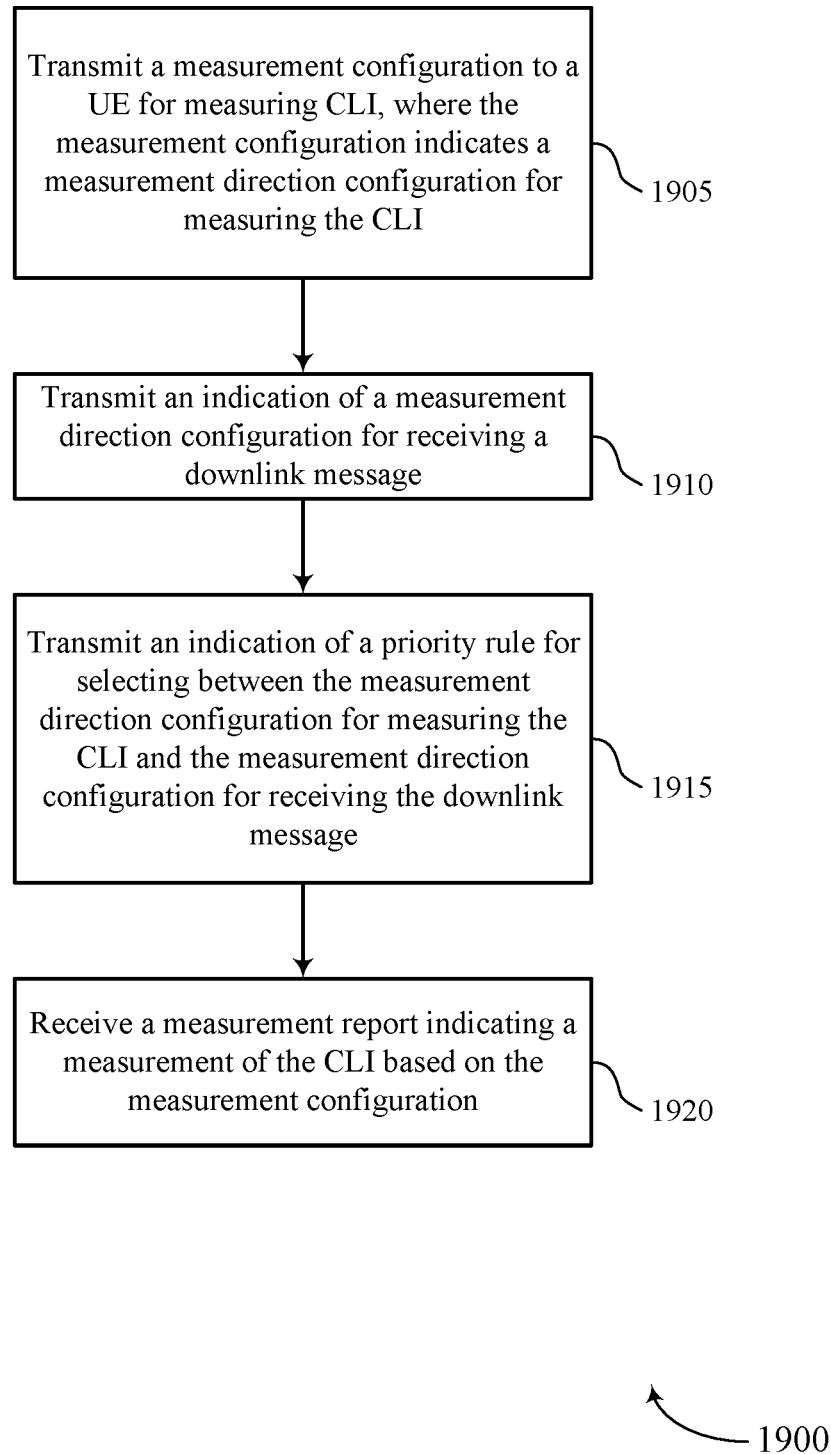

FIG. 19 shows a flowchart illustrating a method 1900 that supports measuring CLI in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1905, the base station may transmit a measurement configuration to a UE for measuring CLI, where the measurement configuration indicates a measurement direction configuration for measuring the CLI. The operations of 1905 may be performed according to the methods described herein. In some examples, aspects of the operations of 1905 may be performed by a measurement configuration component as described with reference to FIGS. 10 through 13.

At 1910, the base station may transmit an indication of a measurement direction configuration for receiving a downlink message. The operations of 1910 may be performed according to the methods described herein. In some examples, aspects of the operations of 1910 may be performed by a measurement direction component as described with reference to FIGS. 10 through 13.

At 1915, the base station may transmit an indication of a priority rule for selecting between the measurement direction configuration for measuring the CLI and the measurement direction configuration for receiving the downlink message. The operations of 1915 may be performed according to the methods described herein. In some examples, aspects of the operations of 1915 may be performed by a priority component as described with reference to FIGS. 10 through 13.

At 1920, the base station may receive a measurement report indicating a measurement of the CLI based on the measurement configuration. The operations of 1920 may be performed according to the methods described herein. In some examples, aspects of the operations of 1920 may be performed by a report component as described with reference to FIGS. 10 through 13.

Figure 20:
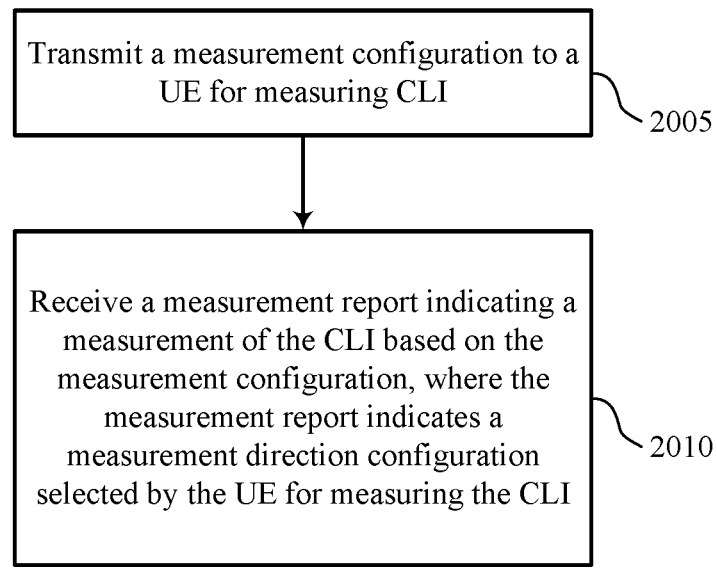

FIG. 20 shows a flowchart illustrating a method 2000 that supports measuring CLI in accordance with aspects of the present disclosure. The operations of method 2000 may be implemented by a base station 105 or its components as described herein. For example, the operations of method 2000 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2005, the base station may transmit a measurement configuration to a UE for measuring CLI. The operations of 2005 may be performed according to the methods described herein. In some examples, aspects of the operations of 2005 may be performed by a measurement configuration module as described with reference to FIGS. 10 through 13.

At 2010, the base station may receive a measurement report indicating a measurement of the CLI based on the measurement configuration, where the measurement report indicates a measurement direction configuration selected by the UE for measuring the CLI. The operations of 2010 may be performed according to the methods described herein. In some examples, aspects of the operations of 2010 may be performed by a report module as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving a measurement configuration for measuring cross link interference, wherein the measurement configuration indicates a measurement direction configuration for measuring the cross link interference; measuring the cross link interference based at least in part on the measurement configuration; and transmitting a measurement report based at least in part on measuring the cross link interference.

Aspect 2: The method of aspect 1, further comprising: identifying a time period scheduled for measuring the cross link interference and scheduled for receiving a downlink message; and selecting between the measurement direction configuration for measuring the cross link interference and a measurement direction configuration for receiving the downlink message based at least in part on a priority rule.

Aspect 3: The method of aspect 2, wherein the priority rule prioritizes the measurement direction configuration for measuring the cross link interference over the measurement direction configuration for measuring the downlink message.

Aspect 4: The method of aspect 2, wherein the priority rule prioritizes the measurement direction configuration for measuring the downlink message over the measurement direction configuration for measuring the cross link interference.

Aspect 5: The method of aspect 4, further comprising: measuring the cross link interference and receiving the downlink message during the time period based at least in part on the priority rule.

Aspect 6: The method of any of aspects 4 through 5, further comprising: identifying a direction misalignment between the measurement direction configuration for measuring the downlink message and the measurement direction configuration for measuring the cross link interference; and refraining from measuring the cross link interference during the time period based at least in part on identifying the direction misalignment.

Aspect 7: The method of any of aspects 1 through 6, further comprising: receiving a measurement trigger signal, wherein measuring the cross link interference, transmitting the measurement report, or both, are based at least in part on the measurement trigger signal.

Aspect 8: The method of any of aspects 1 through 7, wherein the measurement direction configuration for measuring the cross link interference indicates a transmission configuration indication indicating a receive beam direction for measuring the cross link interference, a quasi-colocation (QCL) configuration, or both.

Aspect 9: The method of any of aspects 1 through 8, wherein the measurement configuration for measuring the cross link interference comprises radio resource control signaling, a medium access control-control element, or downlink control information.

Aspect 10: The method of any of aspects 1 through 9, wherein the measurement configuration for measuring the cross link interference further comprises an updated measurement direction configuration associated with a plurality of cross link interference resource identifiers.

Aspect 11: The method of any of aspects 1 through 10, wherein measuring the cross link interference comprises: measuring a sounding reference signal reference signal received power or a cross link interference received signal strength indicator.

Aspect 12: A method for wireless communications at a UE, comprising: receiving a measurement configuration for measuring cross link interference; selecting a measurement direction configuration for measuring the cross link interference based at least in part on the measurement configuration; and transmitting a measurement report based at least in part on measuring the cross link interference, wherein the measurement report indicates the measurement direction configuration selected for measuring the cross link interference.

Aspect 13: The method of aspect 12, wherein selecting the measurement direction configuration further comprises: aligning a first measurement direction configuration for measuring the cross link interference and a second measurement direction configuration for receiving a downlink message.

Aspect 14: The method of any of aspects 12 through 13, wherein selecting the measurement direction configuration further comprises: identifying an updated measurement direction configuration based at least in part on a channel condition change, the measurement direction configuration selected for measuring the cross link interference is based at least in part on the updated measurement direction configuration.

Aspect 15: The method of any of aspects 12 through 14, further comprising: receiving a measurement trigger signal, wherein measuring the cross link interference, transmitting the measurement report, or both, are based at least in part on the measurement trigger signal.

Aspect 16: The method of any of aspects 12 through 15, wherein the measurement direction configuration selected for measuring the cross link interference indicates a transmission configuration indication indicating a receive beam direction for measuring the cross link interference, a quasi-colocation (QCL) configuration, or both.

Aspect 17: The method of any of aspects 12 through 16, wherein the measurement configuration for measuring the cross link interference comprises radio resource control signaling, a medium access control-control element, or downlink control information.

Aspect 18: The method of any of aspects 12 through 17, wherein measuring the cross link interference comprises: measuring a sounding reference signal reference signal received power or a cross link interference received signal strength indicator.

Aspect 19: A method for wireless communications at a base station, comprising: transmitting a measurement configuration to a UE for measuring cross link interference, wherein the measurement configuration indicates a measurement direction configuration for measuring the cross link interference; and receiving a measurement report indicating a measurement of the cross link interference based at least in part on the measurement configuration.

Aspect 20: The method of aspect 19, further comprising: transmitting an indication of a measurement direction configuration for receiving a downlink message; and transmitting an indication of a priority rule for selecting between the measurement direction configuration for measuring the cross link interference and the measurement direction configuration for receiving the downlink message.

Aspect 21: The method of aspect 20, wherein the priority rule prioritizes the measurement direction configuration for measuring the cross link interference over the measurement direction configuration for measuring the downlink message.

Aspect 22: The method of aspect 20, wherein the priority rule prioritizes the measurement direction configuration for measuring the downlink message over the measurement direction configuration for measuring the cross link interference.

Aspect 23: The method of any of aspects 19 through 22, further comprising: transmitting a measurement trigger signal, wherein receiving the measurement report is based at least in part on the measurement trigger signal.

Aspect 24: The method of any of aspects 19 through 23, wherein the measurement direction configuration for measuring the cross link interference indicates a transmission configuration indication indicating a receive beam direction for measuring the cross link interference, a quasi-colocation (QCL) configuration, or both.

Aspect 25: The method of any of aspects 19 through 24, wherein the measurement configuration for measuring the cross link interference comprises radio resource control signaling, a medium access control-control element, or downlink control information.

Aspect 26: The method of any of aspects 19 through 25, wherein the measurement of the cross link interference comprises a sounding reference signal reference signal received power measurement or a cross link interference received signal strength indicator measurement.

Aspect 27: A method for wireless communications at a base station, comprising: transmitting a measurement configuration to a UE for measuring cross link interference; and receiving a measurement report indicating a measurement of the cross link interference based at least in part on the measurement configuration, wherein the measurement report indicates a measurement direction configuration selected by the UE for measuring the cross link interference.

Aspect 28: The method of aspect 27, wherein the measurement direction configuration selected by the UE for measuring the cross link interference indicates a transmission configuration indication indicating a receive beam direction for measuring the cross link interference, a quasi-colocation (QCL) configuration, or both.

Aspect 29: The method of any of aspects 27 through 28, wherein the measurement configuration for measuring the cross link interference comprises radio resource control signaling, a medium access control-control element, or downlink control information.

Aspect 30: The method of any of aspects 27 through 29, wherein the measurement of the cross link interference comprises a sounding reference signal reference signal received power measurement or a cross link interference received signal strength indicator measurement.

Aspect 31: An apparatus for wireless communications at a UE, comprising a processor; memory coupled with the processor; and instructions stored in the memory and executable by the processor to cause the apparatus to perform a method of any of aspects 1 through 11.

Aspect 32: An apparatus for wireless communications at a UE, comprising at least one means for performing a method of any of aspects 1 through 11.

Aspect 33: A non-transitory computer-readable medium storing code for wireless communications at a UE, the code comprising instructions executable by a processor to perform a method of any of aspects 1 through 11.

Aspect 34: An apparatus for wireless communications at a UE, comprising a processor; memory coupled with the processor; and instructions stored in the memory and executable by the processor to cause the apparatus to perform a method of any of aspects 12 through 18.

Aspect 35: An apparatus for wireless communications at a UE, comprising at least one means for performing a method of any of aspects 12 through 18.

Aspect 36: A non-transitory computer-readable medium storing code for wireless communications at a UE, the code comprising instructions executable by a processor to perform a method of any of aspects 12 through 18.

Aspect 37: An apparatus for wireless communications at a base station, comprising a processor; memory coupled with the processor; and instructions stored in the memory and executable by the processor to cause the apparatus to perform a method of any of aspects 19 through 26.

Aspect 38: An apparatus for wireless communications at a base station, comprising at least one means for performing a method of any of aspects 19 through 26.

Aspect 39: A non-transitory computer-readable medium storing code for wireless communications at a base station, the code comprising instructions executable by a processor to perform a method of any of aspects 19 through 26.

Aspect 40: An apparatus for wireless communications at a base station, comprising a processor; memory coupled with the processor; and instructions stored in the memory and executable by the processor to cause the apparatus to perform a method of any of aspects 27 through 30.

Aspect 41: An apparatus for wireless communications at a base station, comprising at least one means for performing a method of any of aspects 27 through 30.

Aspect 42: A non-transitory computer-readable medium storing code for wireless communications at a base station, the code comprising instructions executable by a processor to perform a method of any of aspects 27 through 30.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium.

Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving a measurement configuration for measuring cross link interference, wherein the measurement configuration indicates a first measurement direction configuration for measuring the cross link interference;
   selecting between the first measurement direction configuration for measuring the cross link interference and a second measurement direction configuration for receiving a downlink message based at least in part on a priority rule; and
   transmitting a measurement report based at least in part on measuring the cross link interference in accordance with the measurement configuration and the priority rule.

2. The method of claim 1, further comprising:
   identifying a time period scheduled for measuring the cross link interference and scheduled for receiving the downlink message.

3. The method of claim 2, wherein the priority rule prioritizes the first measurement direction configuration for measuring the cross link interference over the second measurement direction configuration for measuring the downlink message.

4. The method of claim 2, wherein the priority rule prioritizes the second measurement direction configuration for measuring the downlink message over the first measurement direction configuration for measuring the cross link interference.

5. The method of claim 4, further comprising:
   measuring the cross link interference and receiving the downlink message during the time period based at least in part on the priority rule.

6. The method of claim 4, further comprising:
   identifying a direction misalignment between the second measurement direction configuration for measuring the downlink message and the first measurement direction configuration for measuring the cross link interference; and
   refraining from measuring the cross link interference during the time period based at least in part on identifying the direction misalignment.

7. The method of claim 1, further comprising:
   receiving a measurement trigger signal, wherein measuring the cross link interference, transmitting the measurement report, or both, are based at least in part on the measurement trigger signal.

8. The method of claim 1, wherein the first measurement direction configuration for measuring the cross link interference indicates a transmission configuration indication indicating a receive beam direction for measuring the cross link interference, a quasi-colocation (QCL) configuration, or both.

9. The method of claim 1, wherein the measurement configuration for measuring the cross link interference comprises radio resource control signaling, a medium access control-control element, or downlink control information.

10. The method of claim 1, wherein the measurement configuration for measuring the cross link interference further comprises an updated measurement direction configuration associated with a plurality of cross link interference resource identifiers.

11. The method of claim 1, wherein measuring the cross link interference comprises:
    measuring a sounding reference signal reference signal received power or a cross link interference received signal strength indicator.

12. A method for wireless communications at a user equipment (UE), comprising:
    receiving a measurement configuration for measuring cross link interference;
    selecting between a first measurement direction configuration for measuring the cross link interference and a second measurement direction configuration for receiving a downlink message based at least in part on a priority rule; and
    transmitting a measurement report based at least in part on measuring the cross link interference in accordance with the measurement configuration and the priority rule, wherein the measurement report indicates the selected measurement direction configuration.

13. The method of claim 12, further comprising:
aligning the first measurement direction configuration for measuring the cross link interference and the second measurement direction configuration for receiving the downlink message.

14. The method of claim 12, further comprising:
identifying an updated measurement direction configuration based at least in part on a channel condition change, wherein the first measurement direction configuration selected for measuring the cross link interference is based at least in part on the updated measurement direction configuration.

15. The method of claim 12, further comprising:
receiving a measurement trigger signal, wherein measuring the cross link interference, transmitting the measurement report, or both, are based at least in part on the measurement trigger signal.

16. The method of claim 12, wherein the first measurement direction configuration selected for measuring the cross link interference indicates a transmission configuration indication indicating a receive beam direction for measuring the cross link interference, a quasi-colocation (QCL) configuration, or both.

17. The method of claim 12, wherein the measurement configuration for measuring the cross link interference comprises radio resource control signaling, a medium access control-control element, or downlink control information.

18. The method of claim 12, wherein measuring the cross link interference comprises:
measuring a sounding reference signal reference signal received power or a cross link interference received signal strength indicator.

19. A method for wireless communications at a network device, comprising:
transmitting a measurement configuration to a user equipment (UE) for measuring cross link interference, wherein the measurement configuration indicates a first measurement direction configuration for measuring the cross link interference; and
receiving a measurement report indicating a measurement of the cross link interference based at least in part on the measurement configuration and a priority rule corresponding to a selection between the first measurement direction configuration for measurement the cross link interference and a second measurement direction configuration for transmitting a downlink message.

20. The method of claim 19, further comprising:
transmitting an indication of the second measurement direction configuration for receiving the downlink message; and
transmitting an indication of the priority rule for selecting between the first measurement direction configuration for measuring the cross link interference and the second measurement direction configuration for receiving the downlink message.

21. The method of claim 20, wherein the priority rule prioritizes the first measurement direction configuration for measuring the cross link interference over the second measurement direction configuration for measuring the downlink message.

22. The method of claim 20, wherein the priority rule prioritizes the second measurement direction configuration for measuring the downlink message over the first measurement direction configuration for measuring the cross link interference.

23. The method of claim 19, further comprising:
transmitting a measurement trigger signal, wherein receiving the measurement report is based at least in part on the measurement trigger signal.

24. The method of claim 19, wherein the first measurement direction configuration for measuring the cross link interference indicates a transmission configuration indication indicating a receive beam direction for measuring the cross link interference, a quasi-colocation (QCL) configuration, or both.

25. The method of claim 19, wherein the measurement configuration for measuring the cross link interference comprises radio resource control signaling, a medium access control-control element, or downlink control information.

26. The method of claim 19, wherein the measurement of the cross link interference comprises a sounding reference signal reference signal received power measurement or a cross link interference received signal strength indicator measurement.

27. A method for wireless communications at a network device, comprising:
transmitting a measurement configuration to a user equipment (UE) for measuring cross link interference; and
receiving a measurement report indicating a measurement of the cross link interference based at least in part on the measurement configuration and a priority rule corresponding to a selection by the UE between a first measurement direction configuration for measurement the cross link interference and a second measurement direction configuration for transmitting a downlink message, wherein the measurement report indicates the selected measurement direction configuration.

28. The method of claim 27, wherein the selected measurement direction configuration indicates a transmission configuration indication indicating a receive beam direction for measuring the cross link interference, a quasi-colocation (QCL) configuration, or both.

29. The method of claim 27, wherein the measurement configuration for measuring the cross link interference comprises radio resource control signaling, a medium access control-control element, or downlink control information.

30. The method of claim 27, wherein the measurement of the cross link interference comprises a sounding reference signal reference signal received power measurement or a cross link interference received signal strength indicator measurement.

* * * * *